(12) United States Patent
Zimmermann et al.

(10) Patent No.: US 11,391,751 B2
(45) Date of Patent: Jul. 19, 2022

(54) IMPACT SENSOR FOR IDENTIFYING AN IMPACT OR ANY OTHER ACCELERATION

(71) Applicant: Schreiner Group GmbH & Co. KG, Oberschleissheim (DE)

(72) Inventors: Peter Zimmermann, Munich (DE); Pierre Goeppert, Munich (DE); Kurt Kugler, Karlsfeld (DE); Jan Rogge, Munich (DE); Thomas Samuel, Munich (DE); Sebastian Baur, Moosburg a. d. Isar (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 1038 days.

(21) Appl. No.: 16/069,937

(22) PCT Filed: Dec. 20, 2016

(86) PCT No.: PCT/EP2016/081980
§ 371 (c)(1),
(2) Date: Jul. 13, 2018

(87) PCT Pub. No.: WO2017/121586
PCT Pub. Date: Jul. 20, 2017

(65) Prior Publication Data
US 2019/0011476 A1    Jan. 10, 2019

(30) Foreign Application Priority Data
Jan. 14, 2016 (DE) .................. 10 2016 100 573.8

(51) Int. Cl.
*G01P 15/00* (2006.01)
*G01P 15/03* (2006.01)
*G01P 15/04* (2006.01)

(52) U.S. Cl.
CPC .......... *G01P 15/006* (2013.01); *G01P 15/038* (2013.01); *G01P 15/04* (2013.01); *G01P 15/036* (2013.01)

(58) Field of Classification Search
CPC .... G01P 15/038; G01P 15/006; G01P 15/032; G01P 15/03; G01P 15/036; G01P 15/06; G01P 15/04
See application file for complete search history.

(56) References Cited

U.S. PATENT DOCUMENTS

| 4,125,085 | A |   | 11/1978 | Rubey |
| 4,177,751 | A | * | 12/1979 | Rubey .................. G01P 15/04 |
|           |   |   |         | 116/203 |

(Continued)

FOREIGN PATENT DOCUMENTS

| DE | 10 2010 053038 A1 | 7/2011 |
| WO | 03/107015 A1 | 12/2003 |

(Continued)

OTHER PUBLICATIONS

International Search Report of PCT/EP2016/081980, dated Mar. 27, 2017.

*Primary Examiner* — Helen C Kwok
(74) *Attorney, Agent, or Firm* — Collard & Roe, P.C.

(57) ABSTRACT

Impact or acceleration sensor, which contains a liquid droplet and is designed such that the position and/or distribution of the liquid indicates whether an impact or any other acceleration of a predetermined minimum magnitude has occurred, includes: first and second foils, a cavity disposed between the foil faces of the foils and at least one retaining structure disposed on the foil face of the first and/or second foil and functions to maintain the liquid in a predetermined first sub-volume of the cavity. The retaining structure is a region of the first and/or second foil formed as a local elevation, depression or irregularity of the foil face, which (Continued)

Figure 5A:
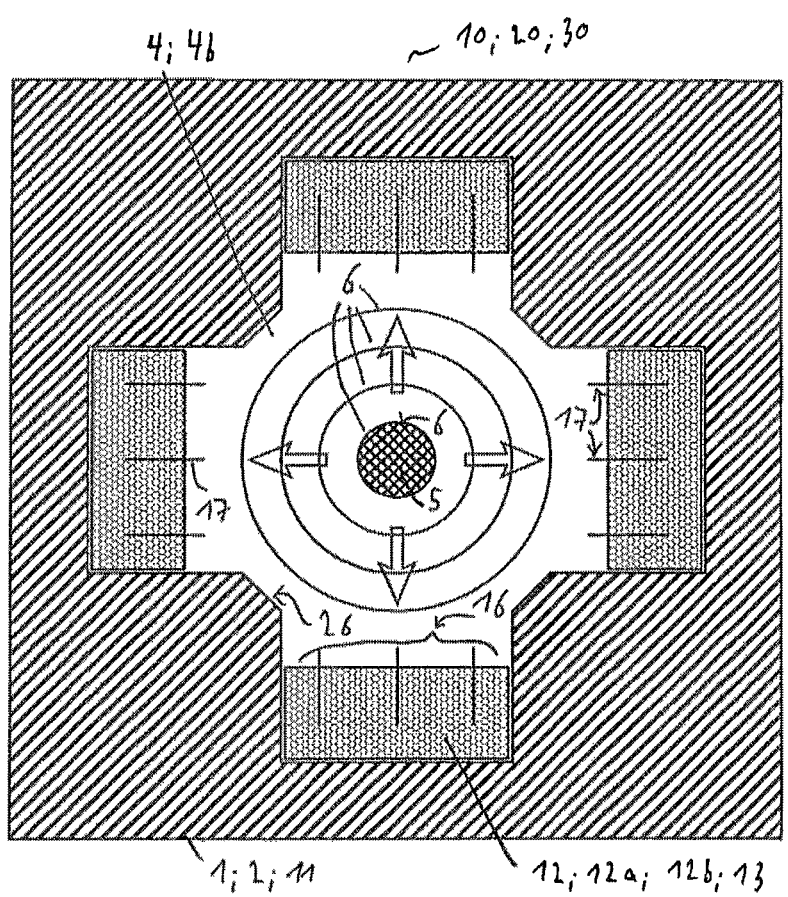

forms a passable barrier for the wetting and/or contacting of the first and/or second foil by the liquid and defines an area piece of the foil face of the first and/or second foil corresponding to the first sub-volume.

15 Claims, 11 Drawing Sheets

(56) References Cited

U.S. PATENT DOCUMENTS

| | | | |
|---|---|---|---|
| 4,237,736 A * | 12/1980 | Wright | G01P 15/04 |
| | | | 73/509 |
| 4,698,623 A | 10/1987 | Smith | |
| 5,323,729 A | 6/1994 | Rubey | |
| 6,367,408 B1 | 4/2002 | Gu | |
| 8,387,552 B2 | 3/2013 | Branch | |
| 9,593,968 B1 * | 3/2017 | Garcia | G01P 15/038 |
| 9,952,069 B2 | 4/2018 | Nakamura | |
| 2012/0312071 A1 * | 12/2012 | Branch | G01P 15/06 |
| | | | 73/12.07 |
| 2012/0312224 A1 | 12/2012 | Branch | |
| 2014/0123755 A1 | 5/2014 | Goto | |
| 2014/0238130 A1 * | 8/2014 | Kim | G01P 15/006 |
| | | | 73/514.05 |
| 2014/0360269 A1 | 12/2014 | Burghardt et al. | |
| 2016/0125780 A1 * | 5/2016 | Visser | G01C 9/10 |
| | | | 73/514.09 |
| 2016/0161297 A1 | 6/2016 | Nakamura | |
| 2019/0094257 A1 * | 3/2019 | Wardrup | G01P 15/038 |
| 2019/0367238 A1 * | 12/2019 | Ward | B65D 79/02 |
| 2019/0391026 A1 * | 12/2019 | Sethi | G01L 9/0091 |

FOREIGN PATENT DOCUMENTS

| | | |
|---|---|---|
| WO | 2012/170252 A2 | 12/2012 |
| WO | 2015/166786 A1 | 4/2017 |

* cited by examiner

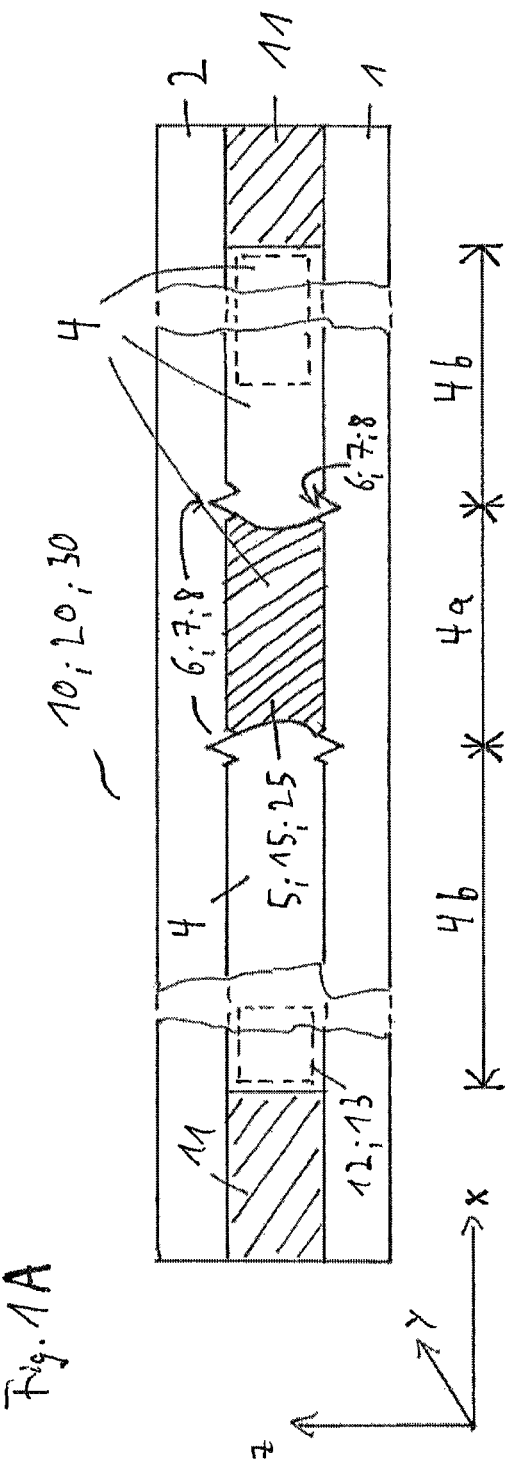
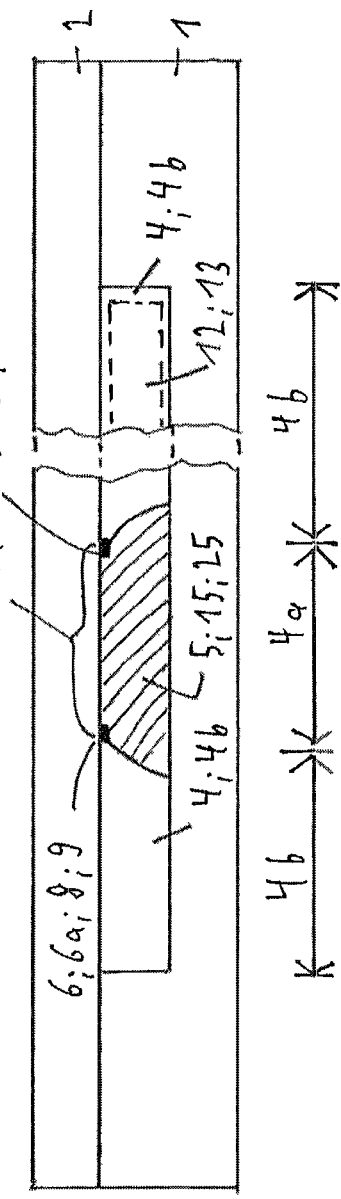

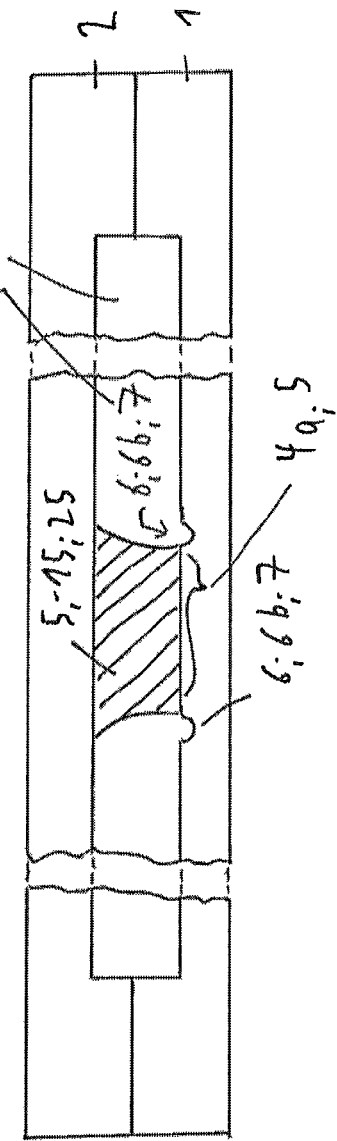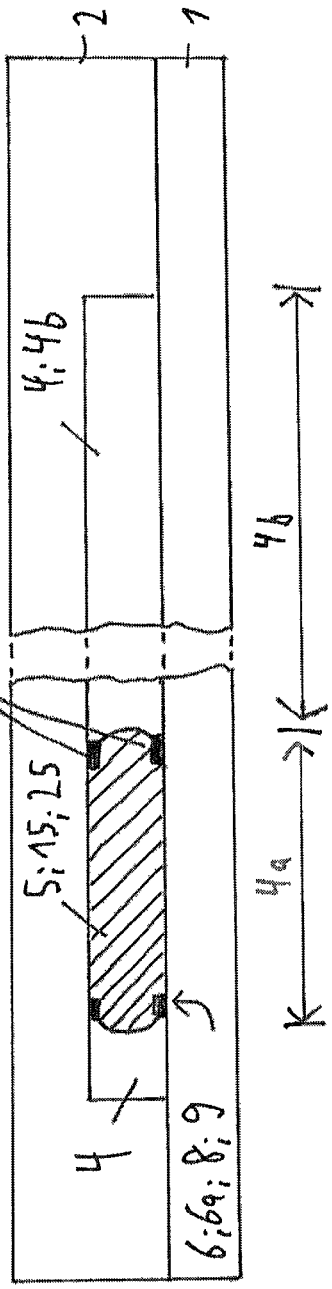

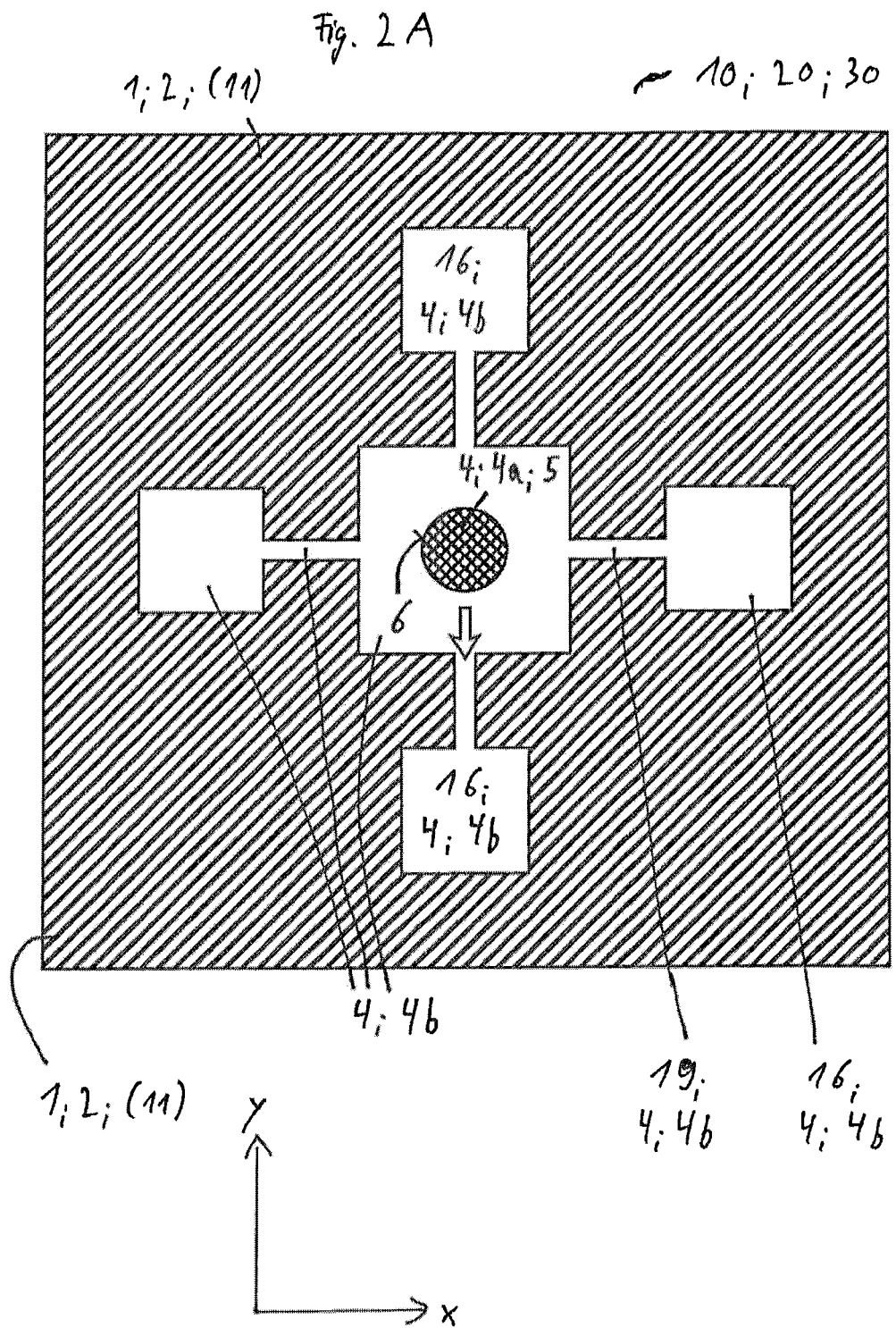

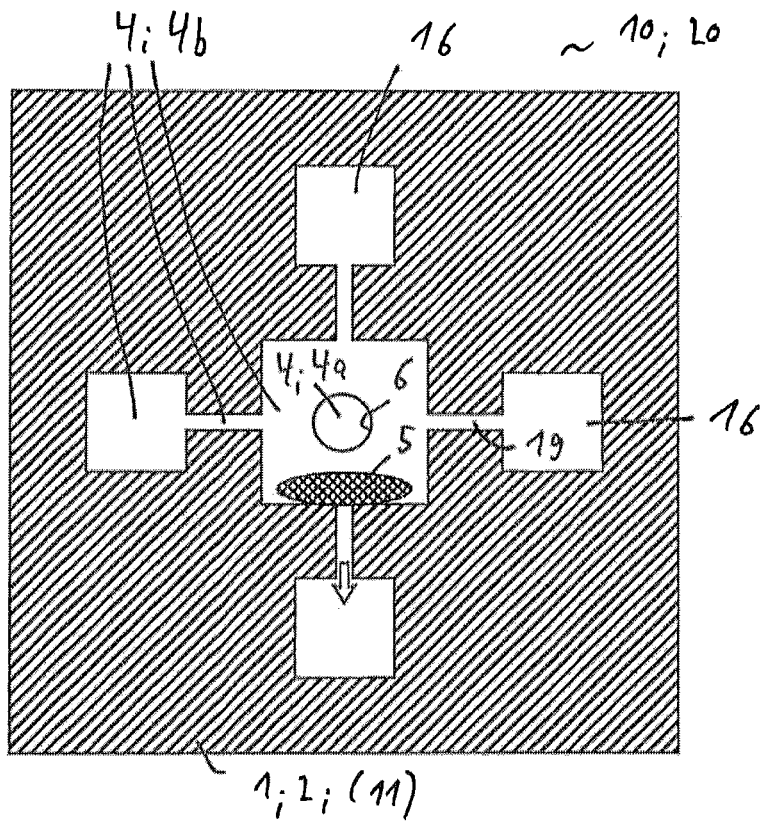
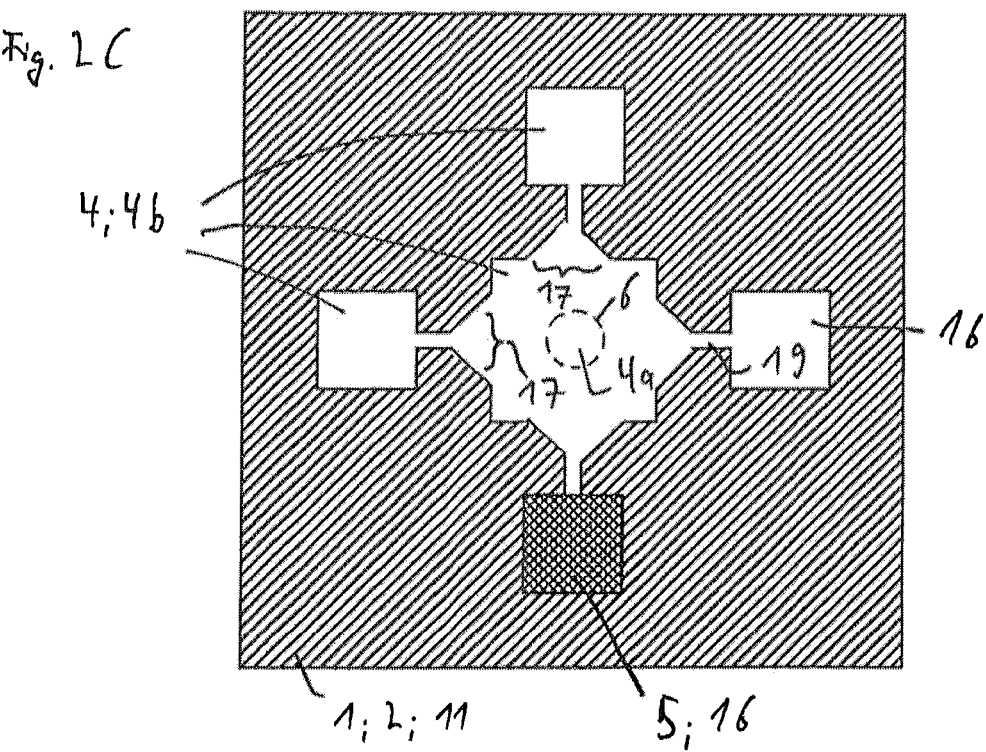

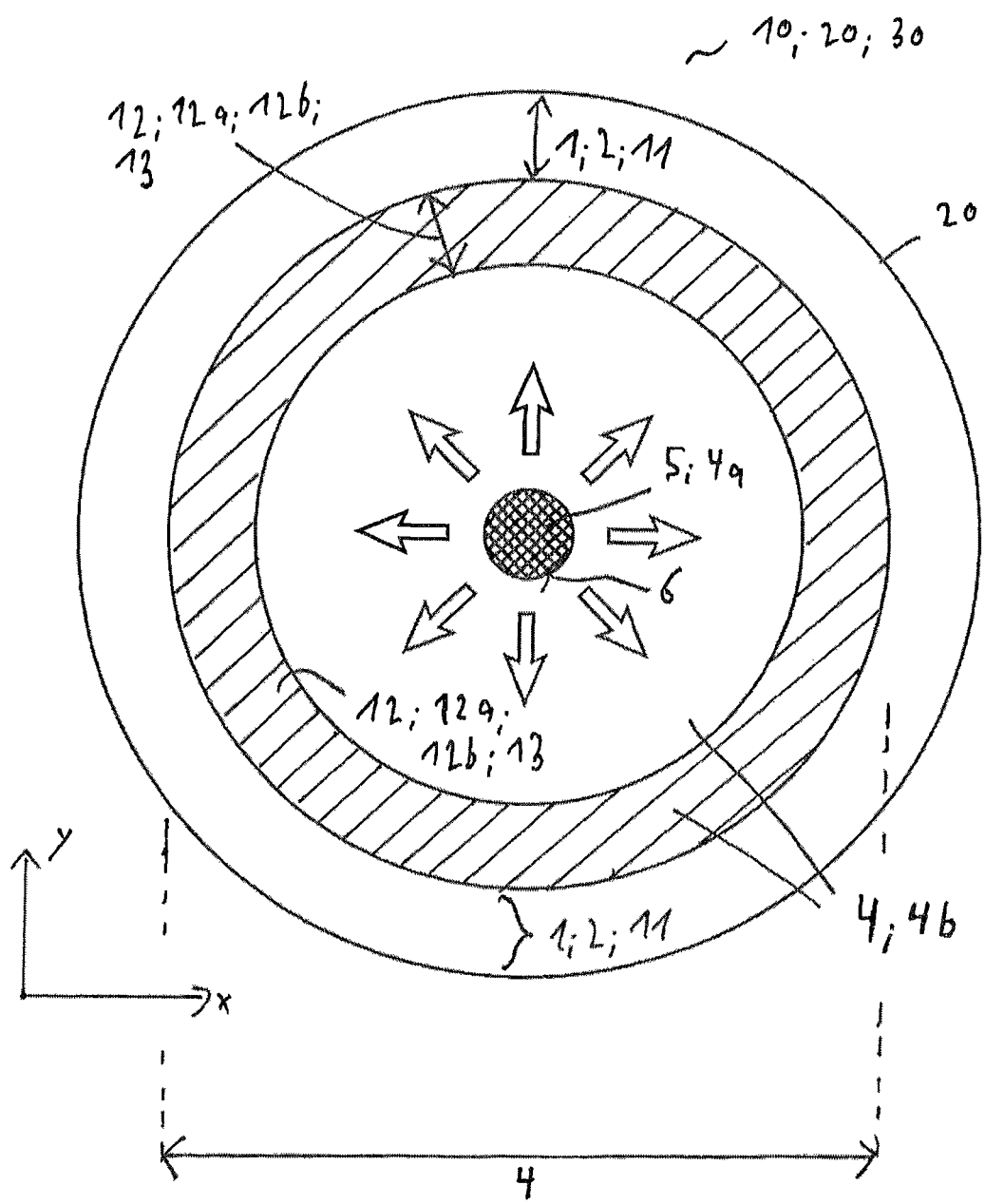

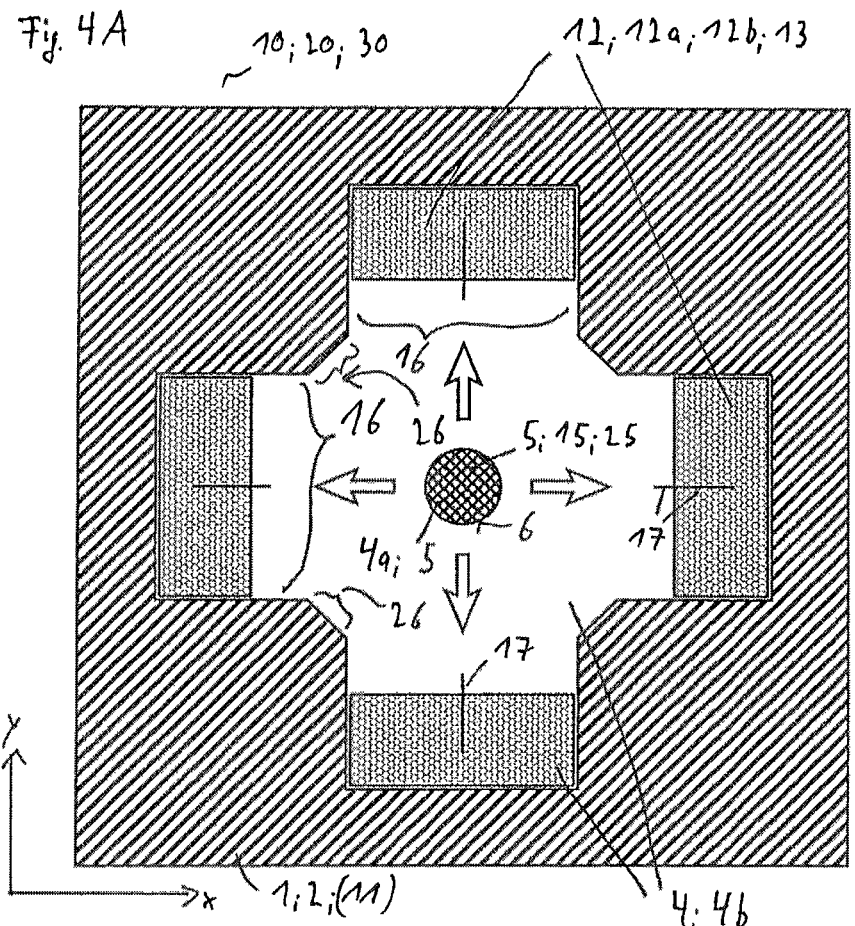
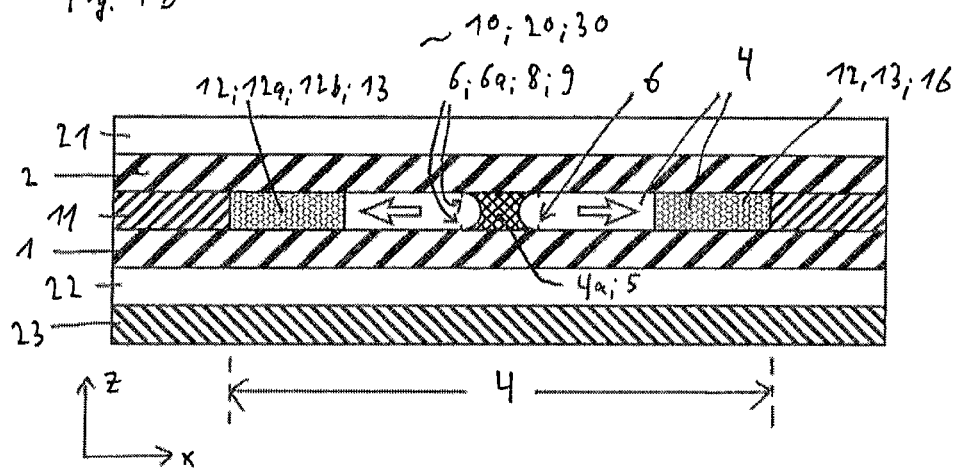

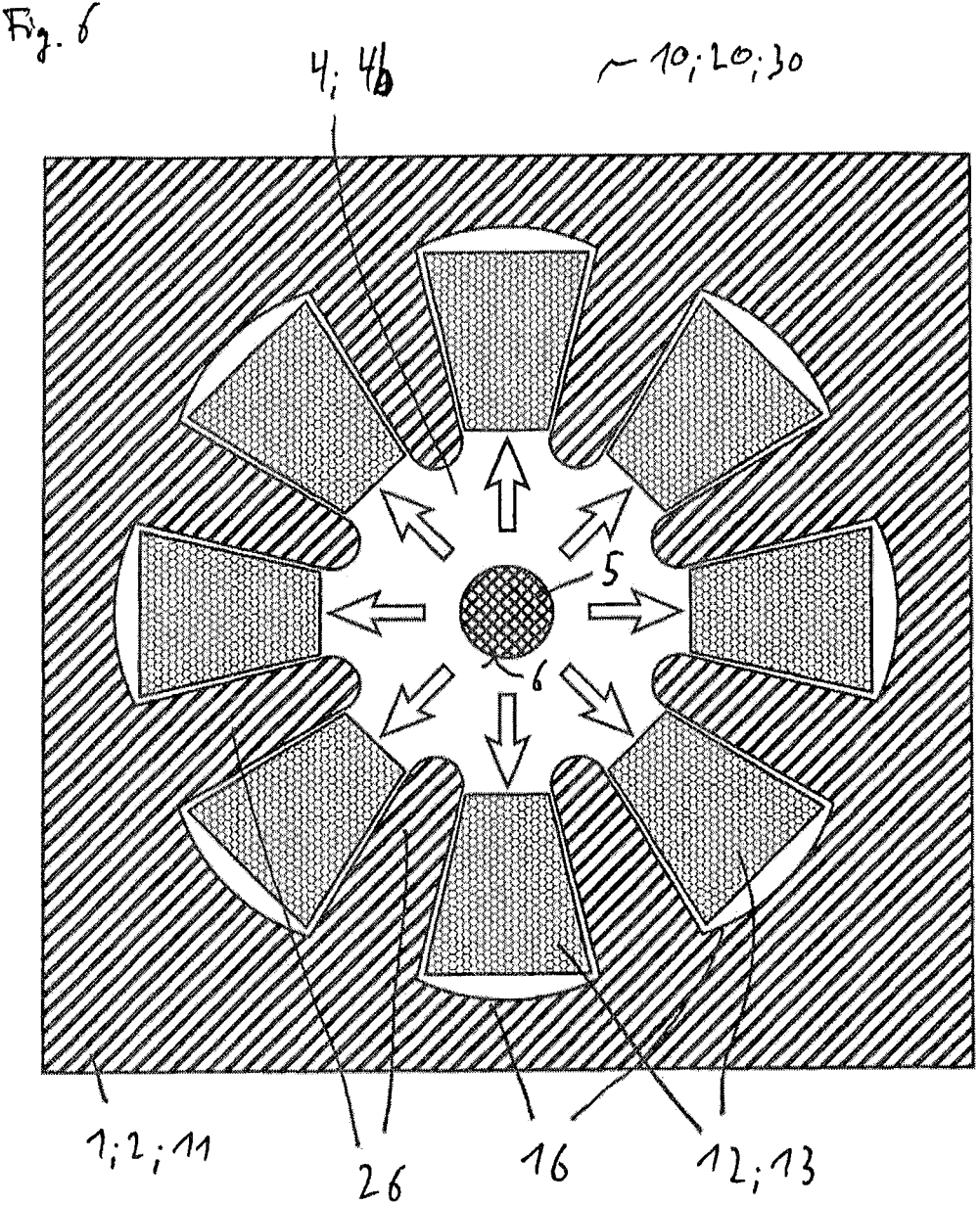

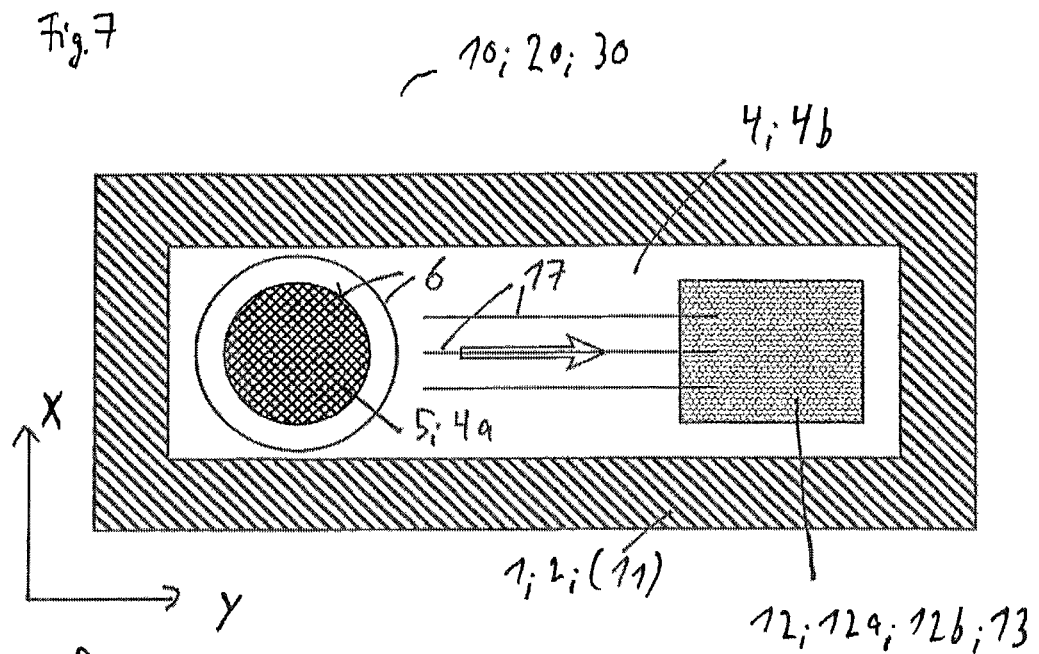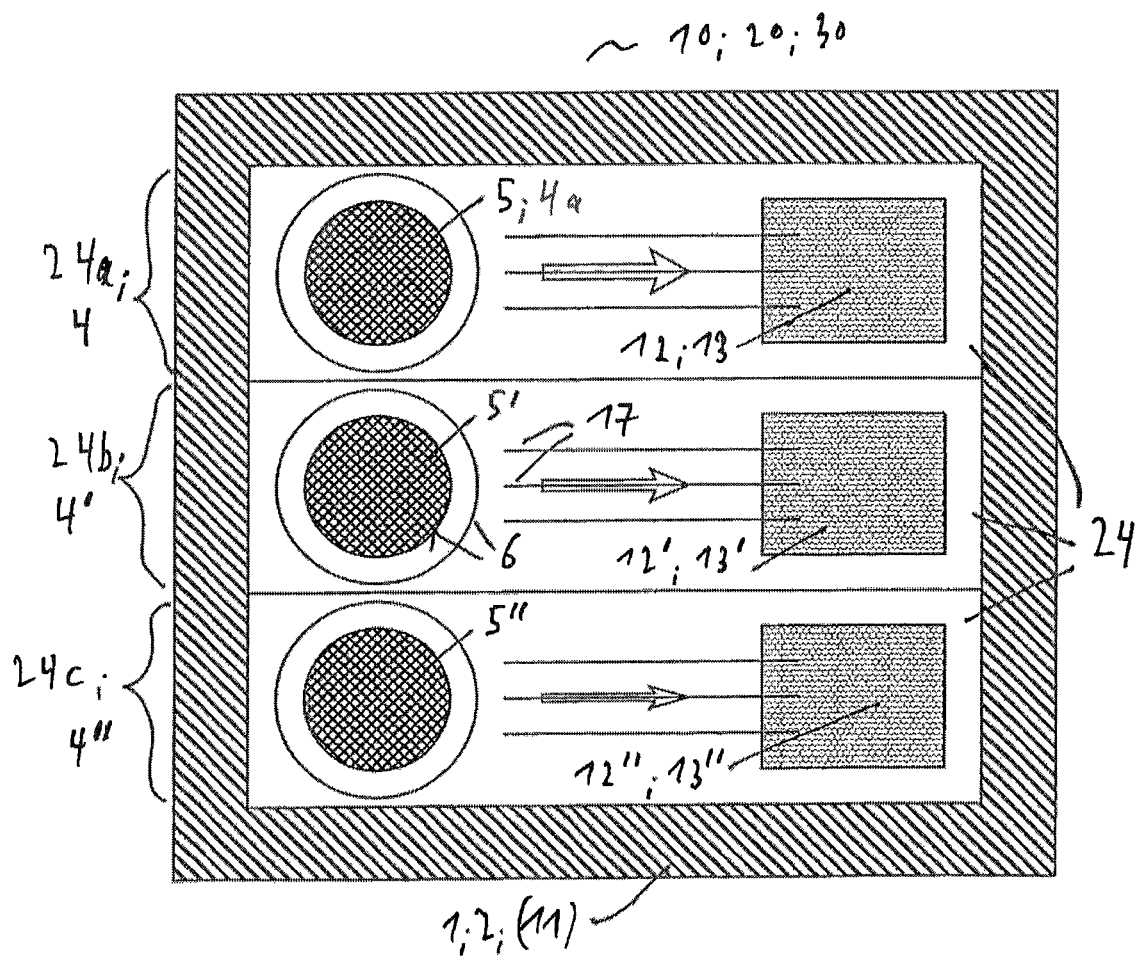

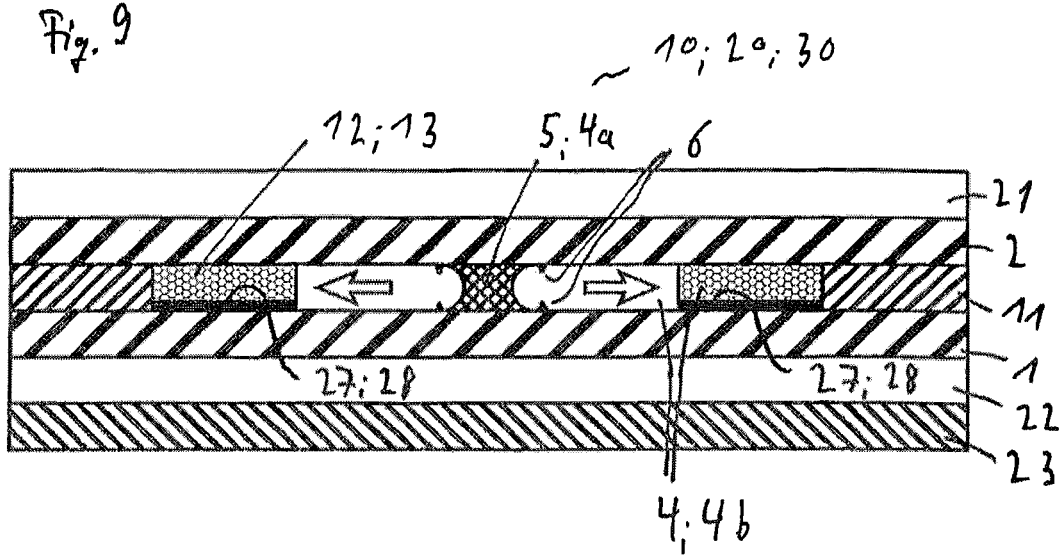
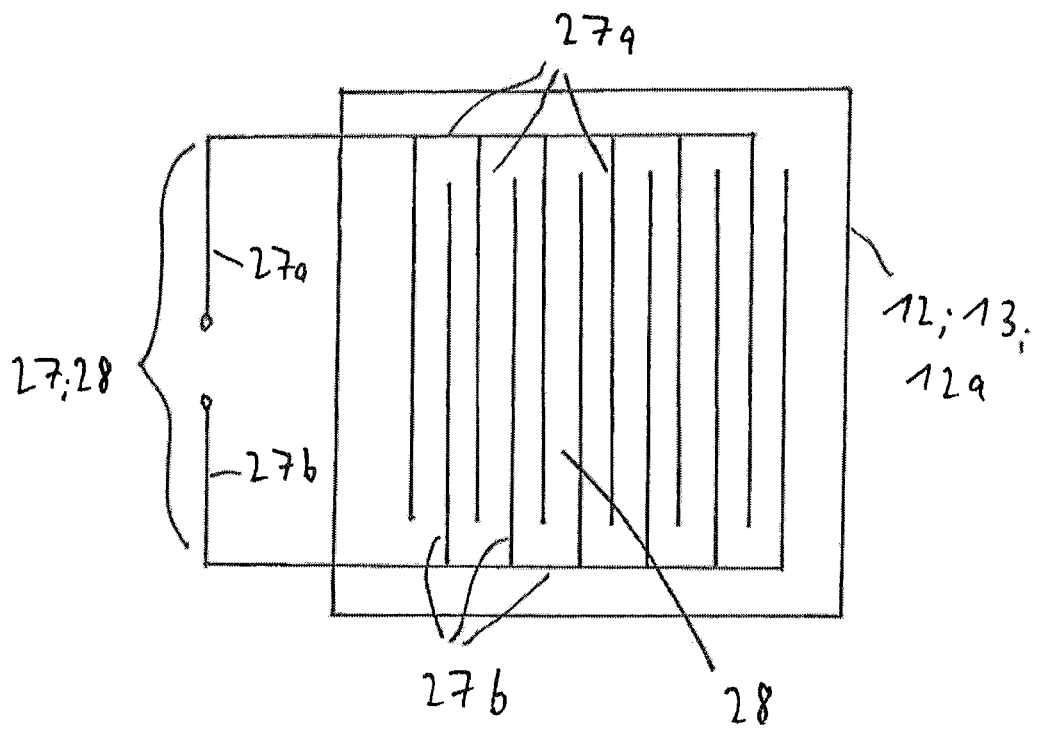

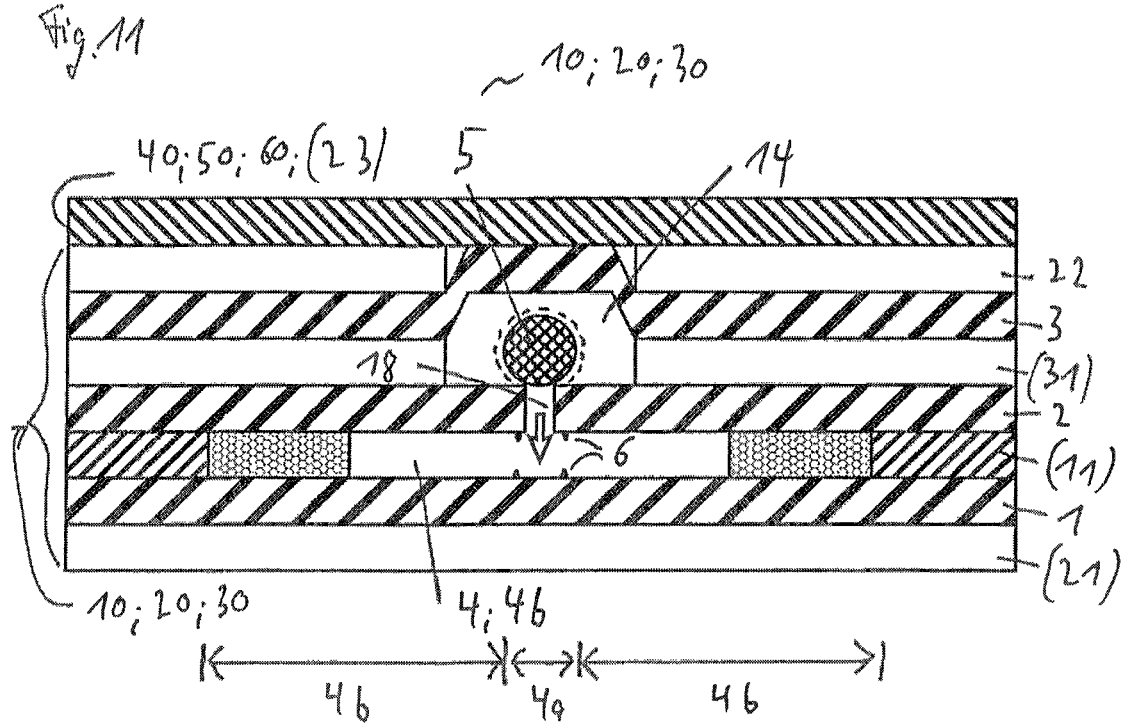
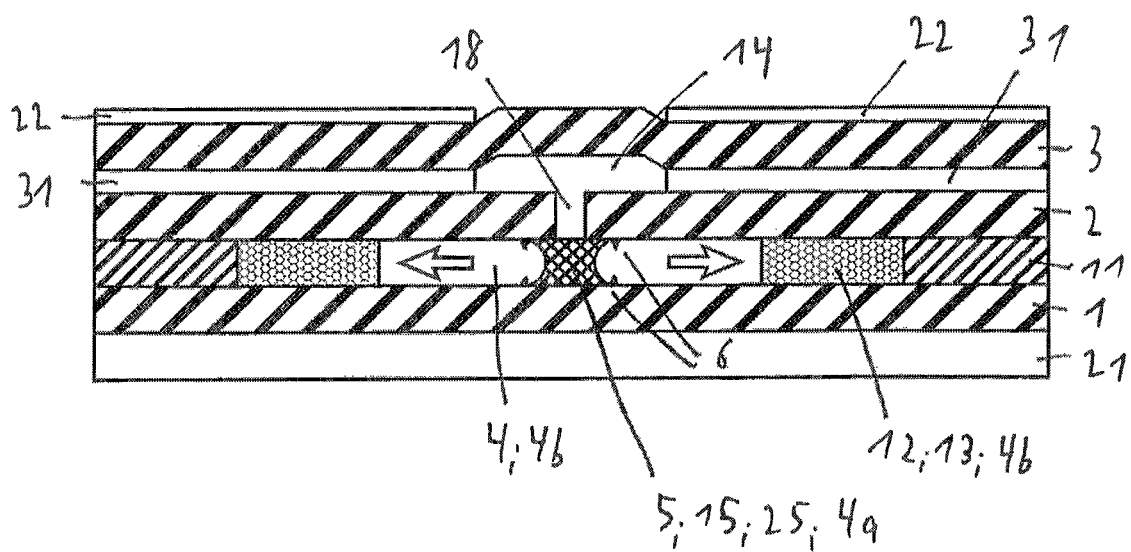

IMPACT SENSOR FOR IDENTIFYING AN IMPACT OR ANY OTHER ACCELERATION

CROSS REFERENCE TO RELATED APPLICATIONS

This application is the National Stage of PCT/EP2016/081980 filed on Dec. 20, 2016, which claims priority under 35 U.S.C. § 119 of German Application No. 10 2016 100 573.8 filed on Jan. 14, 2016, the disclosure of which is incorporated by reference. The international application under PCT article 21(2) was not published in English.

The present application relates to an impact sensor for detection of an impact or of any other acceleration. During the handling, the use and especially the transportation or shipping of articles or larger systems, impacts and other forms of damage may occur as a consequence of improper handling, for the detection of which corresponding impact sensors can be used. An impact or any other acceleration of a magnitude above the minimum magnitude detectable by an impact sensor is recorded by the sensor and permanently indicated. As an example, the recipient of a packet, of a package or of any other article is thereby able to determine, on the basis of the sensor, whether the risk of a damage exists and whether the article must be examined more closely.

Some conventional impact sensors contain a container with a liquid, which moves inside the container only when the article is inclined by a certain minimum angle or is exposed to a certain minimum acceleration and thus brings about an indication of the tilting, impact or acceleration process that has occurred. A disadvantage for conventional impact sensors, however, is the usually very complicated three-dimensional construction and the correspondingly high expense in terms of work and costs for their manufacture.

It is the task of the present application to provide, for detection of an impact or any other acceleration, an impact sensor that is constructed in less complex manner and that can be manufactured more simply and/or more inexpensively.

This task is accomplished by the impact sensor according to claim 1.

An impact sensor is proposed that can be manufactured substantially as a layer composite, especially as a foil-based layer composite, i.e. formed with use of foils and especially plastic foils. Such a layer composite can be manufactured simply, inexpensively and in large quantities at high output rate in label manufacture and in other areas of application. The impact sensor described in this Application succeeds without complex, three-dimensionally-structured individual parts, as are otherwise built into conventional impact sensors, in particular without complex injection-molded parts or complexly shaped individual parts of other cast or pressed shapes. The impact sensor described here can be glued as an inexpensive consumable product onto any arbitrary article, especially onto mailed items, packages or even larger devices or systems, and it already permits, before the opening or start of operation of the sensor-monitored article, a first check of whether the contents or the article have or has been exposed to stronger accelerations. As one of many application possibilities, for example, it is conceivable to equip containers for chemical substances, liquids or other pharmaceutical forms, for example medicine containers, with such an impact sensor; possibly for quality control of medicines, which contain, for example, protein molecules with a predetermined three-dimensional structure or a predetermined three-dimensional entanglement, that could decompose in the event of violent impacts. Regardless of this application example, however, the following embodiments are applicable to any conceivable application capability of impact or acceleration sensors.

Figure 5B:
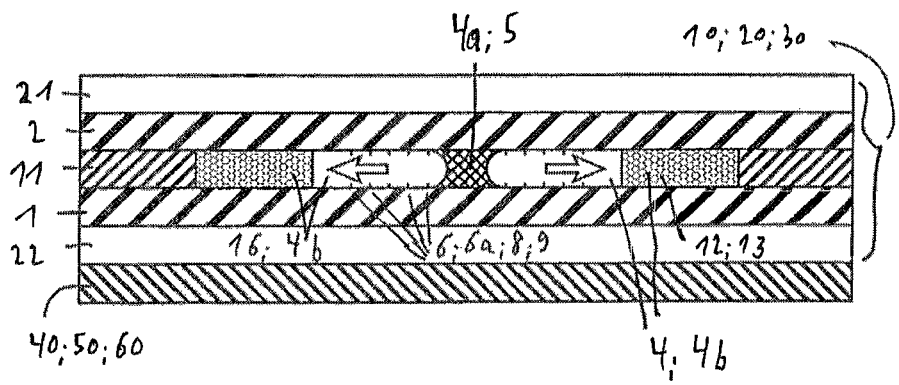

Some exemplary embodiments are described in the following with reference to the figures, wherein:

FIGS. 1A to 1D show some exemplary embodiments of impact sensors according to the Application with a layer composite in cross-sectional view, FIGS. 2A to 2C show schematic diagrams of an impact sensor with several encircling chambers having various positions of a liquid droplet prior to an impact, during the impact and after the impact, FIG. 3 shows an impact sensor that, spaced apart from a retaining structure, contains a material for detection of liquid that has encroached over the retaining structure, FIGS. 4A and 4B show, in overhead view and in cross-sectional view, an exemplary embodiment of an impact sensor, the cavity of which contains a multiplicity of lateral bulges with separate pieces or regions of a material for directionally dependent detection of liquid that has escaped, FIGS. 5A and 5B show an exemplary embodiment of an impact sensor with a larger number of retaining and/or guide structures than in the exemplary embodiment of FIGS. 4A and 4B, FIG. 6 shows an exemplary embodiment of an impact sensor with a larger number of lateral bulges and material pieces, FIG. 7 shows an exemplary embodiment of an impact sensor for selective detection of impacts along an individual, predetermined preferential direction, FIG. 8 shows an improvement compared with FIG. 7, wherein the impact sensor has a multiplicity of cavities, in which impacts of different minimum magnitude are detectable with respectively differently high detection sensitivity, FIG. 9 shows an exemplary embodiment of an impact sensor for an electrical measurement of an impact, FIG. 10 shows an exemplary electrode array for an electrical measurement of an impact, which is suitable for the impact sensor from FIG. 9, in schematic overhead view, FIG. 11 shows an exemplary embodiment of an impact sensor, which can be switched at a freely selectable instant into a state sensitive for impacts, in an original starting state in which the impact sensor is not sensitive for impacts, FIG. 12 shows the impact sensor from FIG. 11 in a sensitive state, i.e. prepared for detection of an impact, in which the impact sensor has already been activated, but which has not yet suffered any impact above the detectable minimum magnitude.

FIGS. 1A to 1D show some exemplary embodiments of impact sensors in cross-sectional view. According to this and the following exemplary embodiments, the impact sensor 10 is formed as layer composite 20, wherein the layer composite 20 contains a liquid 5 in the form of a droplet 15 or of any other liquid reservoir 25, which is disposed inside layer composite 20. Despite the simple construction of the layer composite 20, impacts or other accelerations or braking processes that exceed a predetermined minimum magnitude can be detected and permanently indicated in the embodiments proposed here by a change of the position, extent and/or distribution of the liquid in the interior of the layer composite 20. The layer composite 20 of the impact sensor 10 comprises at least one first foil 1, one second foil 2 and at least one cavity 4, slot or other recess disposed between these two foils. For the sake of brevity, only the term cavity will be mentioned in the following. The cavity 4 extends over a part of the base face of the layer composite 20 and forms a volume that is partly filled with the liquid 5, but to a preponderant part with air, another gas or a gas mixture. Alternatively, the residual volume in the cavity 4, to the extent that it is not filled with the liquid 5 used for detection purposes, may also be filled with another, further liquid, which does not mix automatically with the actual detection liquid 5. In both cases, the liquid 5 preferably possesses a higher or in any case different surface tension, wetting capability, adhesion force, density and/or viscosity than the medium surrounding it inside the cavity 4. Preferably, however, the cavity 4 is filled outside of the liquid 5 with air or another gaseous, i.e. much lighter and less dense medium.

According to FIG. 1A, the cavity 4 is situated between two foils 1, 2, which are spaced apart from one another by an intermediate layer 11 and are held apart from one another by a predetermined spacing, which preferably is uniformly large over the base face of the layer composite 20 and corresponds to the thickness or height of the cavity 4. The two foils 1, 2 are, for example, plastic foils of suitable layer thickness, for example between 0.1 mm and 1.0 mm. Alternatively, other materials as explained hereinafter may also be used. The cavity 4 in FIG. 4 forms a volume wherein, during use, i.e. in the state of the sensor that is sensitive for impacts and mechanical accelerations, a first part is filled by design with the liquid 5 and a second part is free or initially still free of liquid. That part of the volume or of the cavity 4 which in the ready-to-use, i.e. sensitive state of the impact sensor 10 is filled with the liquid 5 will be referred to in the following as the first sub-volume 4a of the cavity 4, and the remaining volume, surrounding the liquid in the cavity or in any case not filled with it, will be referred to in the following as the second sub-volume 4b of the cavity 4. The second sub-volume 4b functions to collect at least one part of the liquid 5 in the event of the action of an impact or of any other acceleration of sufficient magnitude, when thereby the liquid 5 is conveyed out of the first sub-volume 4a into the second sub-volume 4b.

According to the present Application, at least one retaining structure 6 is provided. During the manufacture or at the latest during the activation, i.e. the sensitizing of the impact sensor, the quantity of liquid 5 is positioned in the region of the retaining structure 6, and specifically in a sub-volume 4a of the cavity 4, which is bounded in lateral direction by the position of the at least one retaining structure 6. This can be realized by the fact that the at least one retaining structure 6 is, on the main face of the first and/or second foil 1, 2 adjoining the cavity, an elevation, depression or other irregularity that cannot automatically be crossed or overcome by the liquid droplet.

The at least one retaining structure 6 is therefore a region of the first and/or second foil 1; 2, namely a region that is formed as an elevation, depression or as any other local irregularity of the foil face. The local elevation, depression or other local irregularity of the foil face forms a passable barrier for the wetting and/or contacting of the foil face of the first and/or second foil by the liquid, whereby the first sub-volume 4a to be filled with the liquid is bounded in lateral direction.

For realization of this retaining structure functioning as barrier element, neither an additional shaped part nor any other inlay between the foils is necessary; to the contrary, the retaining element is or the retaining elements are formed by the two foils themselves, i.e. the retaining elements are foil regions of the foils themselves; i.e. foil regions of one of the foils or of both foils 1, 2. It is therefore not necessary to subdivide the cavity between the two foils artificially into two sub-volumes or sub-cavities by the introduction of intermediate walls, intermediate webs or other separating structures. In particular, the spacing and/or the intermediate space between both foils 1, 2 in the region of the at least one retaining structure 6 is free of further material; especially free of wall-like structures and/or solid structures. Thus a subdivision of the cavity volume 4 into the first sub-volume 4a and the second sub-volume 4b is achieved without use of physical separating structures.

The volume of the cavity is therefore a continuous, uninterrupted volume, which comprises the first sub-volume (by design to be filled with liquid) and the second liquid volume (by design, initially filled with air or at least initially kept free of liquid). Thus both sub-volumes of the cavity directly adjoin one another. Especially in the region of the at least one retaining structure 6, the volume of the cavity is continuous or through-going, i.e. free of interruptions. Only the layer thickness of one or both foils and/or the height position of their foil face is changed locally by virtue of the elevation 6a, depression 6b or other irregularity 8 functioning as liquid barrier. But even immediately above or below the retaining structure or structures, i.e. directly above and/or below the elevations, depressions or other irregularities, the two foils 1, 2 are free of walls, spacers, connecting elements or other separating structures.

The lateral extent of the cavity or its volume can therefore be configured in such a way that the liquid can in principle be distributed arbitrarily in the cavity and prevented merely by the at least one retaining structure 6 from penetrating into the second sub-volume 4b, in any case as long as no other impact or no other acceleration above the predetermined minimum magnitude occurs. Below the predetermined minimum magnitude, the retaining structure 6 formed as the elevation 6a, depression 6b or other irregularity 8 acts as the passable barrier for the wetting and/or contacting of the first and/or second foil 1; 2 by the liquid 5.

As a consequence of the surface tension, viscosity or other properties of the liquid 5 or of its behavior at the interface to the main face or foil face of the first and/or second foil 1, 2 exposed in the cavity, an enclosure or in any case fixation of the liquid quantity in the first sub-volume 4a is achieved by the at least one retaining structure 6.

The first sub-volume 4a is in particular that volume fraction of the cavity which, by the projection onto its base face, is surrounded by the at least one retaining structure 6 and thus is disposed in lateral direction inside the retaining structure 6. The elevation, depression or other irregularity thus defines an area piece of the foil face, for example of the lower foil, which corresponds to the first sub-volume 4a or its base or bottom face.

Preferably, respectively one retaining element is formed on both foils. The at least one retaining element 6 then consists of a first retaining element of the first foil and a second retaining element of the second foil, i.e. of one (circular or annular, for example) region each of the foil face of the first as well as second foil.

Preferably, the retaining structure 6 is formed in line-like and self-contained manner on the first and/or second foil 1, 2 or in any case is not provided with any interruptions that in contact with the liquid could not be bypassed by this.

Due to the at least one retaining structure 6, therefore, it is predetermined where, i.e. in which sub-volume 4a the liquid assumes position after the introduction and/or remains, in any case as long as no impacts of accelerations above the detection or sensitivity limit of the impact sensor occur.

The at least one retaining structure 6 is formed in such a way that it permits an escape of the liquid 5 or one part of it only in the case of an impact or of any other acceleration above a predetermined minimum magnitude but otherwise represents a barrier, which—possibly by utilization of the surface tension, wetting capability, adhesion force, density and/or viscosity of the liquid—prevents its escape from the first sub-volume 4a into the second sub-volume 4b. FIG. 1A illustrates respectively one such retaining element, i.e. one such retaining structure 6, in the surfaces of the first and of the second foil 1, 2 adjoining the cavity 4.

As an example, the at least one retaining structure 6 represents a local irregularity 8 that was introduced, during the manufacture and/or processing of the respective foil, into its surface. A retaining structure 6 may be, for example, an irregularity with a line-like course that deviates in comparison with the otherwise planar foil face. The line may be, for example, a scored line, stamped line, embossed line or lasered line or may be produced by another action, e.g. mechanical, on the foil. In FIG. 1A, the line cross section 7 is schematically illustrated for a scored line, for example. The retaining structure 6 is preferably formed in circular or annular manner and thereby defines or encircles an inner face portion of the foil face of foils 1, 2, in which the liquid is positioned during the manufacture or at the latest during the activation, i.e. sensitization or sensitizing of the impact sensor and permanently contacts these face portions.

In the example of FIG. 1A, the liquid 5 is provided in the form of a liquid reservoir 25 fixed in its position by the upper and lower retaining structures 6, especially as water droplets 15, which on the basis of its surface tension is not capable on its own, i.e. without strong external accelerations, of also wetting the foils 1, 2 in the regions laterally outside the retaining structures 6 and/or of therefore emerging laterally from the inner, enclosed first sub-volume 4a. It is only during accelerations or impacts having components in the x-y plane, i.e. in the direction parallel to the base plane of the layer composite 20, that exceed a predetermined minimum magnitude that the liquid 5—under the influence of the external acceleration of the layer composite—overcomes the barrier formed by the retaining structures 6 and thus passes into the neighboring, second sub-volume 4b of the cavity 4, which extends laterally around, outside the retaining structures 6.

Since, after a violent impact, the retaining structures 6 also continue to represent a barrier for the lateral migration of the liquid or of a quantity of liquid that has escaped into the second sub-volume 4b, this part of the liquid no longer returns into the first sub-volume 4a. In the simplest case, the impact that has occurred is recognizable by the liquid quantity that, through a transparent first and/or second foil 1, 2, is visible from outside with the naked eye in the region of the surrounding second sub-volume 4b.

Since the influence of surface tension and/or adhesion force of the liquid on the position of the liquid droplet is stronger than the influence of the dead weight of the liquid, the impact sensor 10 formed as a layer composite 20 can be deployed in any arbitrary orientation and used for impact detection, for example as illustrated in horizontal alignment parallel to the ground surface for detection of horizontal impacts, but also in arbitrary spatially tilted positions. For example, the impact sensor could be turned by 90°, i.e. fastened edgewise on a device or container, in order to indicate an exceedance of a permissible maximum acceleration permanently after a hard landing on the floor.

The impact sensor 10 can be formed in particular as a label 30 and may be provided with further layers, not illustrated in FIG. 1A, for example such for gluing onto an underlying layer or cover layer for inscription of the foil composite of foils 1, 2 enclosing the cavity and if necessary at least one intermediate layer 11 laterally surrounding the cavity 4. The intermediate layer 11 illustrated in FIG. 1A and in some of the subsequent figures may likewise be a foil layer or alternatively, for example, a foam layer or an open-pored or closed-pored foam material. Furthermore, an ink, lacquer or adhesive layer, printed or otherwise applied, may be provided as the intermediate layer 11. The layer thickness of the intermediate layer 11 determines the height of the cavity 4 and is matched to the viscosity, surface tension and/or filling quantity etc. of the liquid being used.

FIGS. 1B to 1D show cross-sectional views of alternative exemplary embodiments of the layer structure of the layer composite 20, which in particular succeed without intermediate layer 11. According to FIG. 1B, the cavity 4 is formed in one of the two foils, for example in a first, lower foil 1, as a thinned region or depression or recess. The other foil 2 may be formed with uniform layer thickness over the entire surface and laterally outside the cavity 4 may be joined directly to the first foil 1. FIG. 1C shows an exemplary embodiment in which both foils 1, 2 have a depression, slot or other recess, which together form the cavity 4. Laterally outside it, both foils 1, 2 are joined firmly to one another, possibly glued, welded or fastened in other manner to one another, especially air-tightly and/or liquid-tightly relative to the liquid 5 contained in the interior of the cavity 4 and to the surrounding atmosphere. In the exemplary embodiments of FIGS. 1A to 1C, the cavity 4 may be formed inside the base face of the layer composite 20 in such a way that it extends outwardly on all sides over the first sub-volume 4a surrounded by the at least one retaining structure 6. It may also possess a particularly large extent on one side or in one direction and also possibly in its opposite direction. For example, a circularly symmetric or round or a mirror-symmetric, especially rectangular cavity base face is compatible with the cross-sectional views of FIGS. 1A to 1C. Thus the cavity 4 or its base face may be formed, for example, as an elongated track for measurement of acceleration forces along predefined directions. The at least one retaining structure 6 and the liquid droplet 15 or liquid reservoir 25 fixed thereby may be disposed in a specified track portion, for example in the middle of the cavity.

FIG. 1D shows an alternative example, in which the liquid 5 is disposed in the vicinity of a rim of the cavity 4. Here also, the cavity 4 in overhead view may be formed on its base face (not illustrated), for example as an elongated track with, for example, rectangular, elongated cross section. According to FIG. 1D, the at least one retaining structure 6 and the liquid droplet 15 fixed thereby, i.e. the first sub-volume 4a filled therewith as designed, is situated close to a first end of the cavity 4, at the left in the drawing plane. In FIG. 1D, respectively at least one raised, i.e. upwardly protruding retaining structure 6 in the form of an annular elevation is further provided on both foils 1, 2, whereas in FIG. 1C one holding structure is provided exclusively in the second foil 2, and specifically as a depression in the lower foil 1.

As materials for the first 1 and/or second foil 2 of FIGS. 1A to 1D as well as all subsequent figures, it is possible to use plastics, for example polyethylene terephthalate (PET), polyethylene (PE), polypropylene (PP), polyvinyl chloride (PVC) or Kapton (i.e. a polyimide). Alternatively, the foils may be adequately stable, mechanically loadable and air-tight as well as liquid-tight lacquer layers, ink layers or other materials, which are matched to the surface tension, wetting capability, adhesion force and/or viscosity of the liquid 5 introduced between them. Each of these foils 1, 2 may consist of one or of more layers or sub-layers, for example to realize the cavity according to FIGS. 1B to 1D by particularly simple fabrication technology.

Moreover, FIGS. 1A to 1D schematically show some exemplary embodiments with respect to the shaping and positioning of the at least one retaining structure 6; these exemplary embodiments—independently of the layer structure selected by way of example in FIGS. 1A to 1D—can be combined with an arbitrary layer structure as well as with all other features of the exemplary embodiments of this Application. By way of example, FIG. 1A shows a pair of (annular) retaining structures 6, which are formed on the faces of both foils 1, 2 turned toward one another and are disposed congruently one above the other; their spacing from one another corresponds to the height or thickness of the cavity. In FIG. 1A, the respective retaining structure 6 forms a local irregularity 8, especially a region of artificially increased roughness or any other kind of depression, upthrow and/or step. As an example, it is a scored line, stamped line, embossed line, lasered line or other structure with an arbitrary cross-sectional profile. It externally bounds a middle face portion, in which the liquid 5 is intended to contact the respective foil 1, 2, selectively, in any case as long as the layer composite 20 of the impact sensor 10 has not yet been exposed to any impact load or acceleration lying above the detection limit. On the basis of the jagged or other uneven line profile transverse to the course of the line as in FIG. 1A (with depressions in the respective foil and/or with lateral elevations or upthrows), the liquid quantity 5 is not able to cross over the respective retaining structure 6 automatically, since the surface tension and/or the locally uneven surface course in the region of the retaining structures 6 prevents a further wetting of the foil surface by the liquid 5. The retaining structure 6 forms a boundary to the second sub-volume 4b, into which the liquid quantity is able to penetrate only by the effect of external impacts. Alternatively, FIG. 1B shows a retaining structure 6 on only one of the foils, and specifically as an elevation that projects into the cavity 4. As an example, the retaining structure 6 may be a printed structure of printing ink or printing compound of a specified layer thickness. It may be preferably colored or stained or alternatively colorless or even transparent; the term printing compound means merely that a printing process has been used for application of the retaining structure 6. Although no comparable retaining structure is illustrated on the other foil in FIG. 1B, the liquid there can be limited by the surface tension of the liquid surface from automatically spreading in lateral direction. In FIG. 1C also, the retaining structure 6 is situated only on one foil 1 and here is formed as depression 6b. In contrast, in FIG. 1D, retaining structures 6 are formed at the faces of both foils 1, 2, which are positioned flush with one another in the direction perpendicular to the layer composite. The retaining structures 6 illustrated in this and the subsequent figures are, for example, retaining webs, possibly scored, stamped, printed, lasered, embossed three-dimensional structure elements or such produced by gas-phase deposition (PVD, CVD) or other working steps, although—contrary to the enlarged, not-to-scale illustration in the figures, merely for the purpose of better recognizability—they are so low that the retaining structures 6 can be produced during fabrication of the layer composite 20, without the need for a complex, three-dimensional shaping in order to retain the liquid 5 in position in the impact sensor 10.

In FIGS. 1A to 1D, the liquid surface exposed in the cavity volume is illustrated as sometimes convex, sometimes concave in the respective cross-sectional view. In practice, the respective course of the liquid surface can be influenced by the dosing of the introduced liquid quantity, by the type and composition of the liquid, by the choice of the material for the foils 1, 2 (corresponding to the desired adhesion strength, wetting and/or surface tension at the interface between the liquid and the respective foil) and last but not least by the height, i.e. the extent of the cavity measured perpendicular to the layer composite, and further by the spatial extent and the course of the retaining structure 6 or retaining structures 6 on the respective foil face.

Examples that can be used as the liquid are water or an aqueous solution, liquid low molecular weight polymers, oligomers or monomers or specific substances such as, for example, glycerol, polyethylene glycol, glycol, mercury or gallium; furthermore, ionic liquids or polar hydrocarbons such as, for example, alcohols, aldehydes or carboxylic acids. Especially liquids with a high boiling point and/or a low vapor pressure are suitable for preventing a premature evaporation of a noteworthy part of the liquid during the manufacture, the transportation and the storage and ultimately the sometimes prolonged duration of use of the impact sensor.

Moreover, a high boiling point or low vapor pressure prevents part of the liquid from condensing in the second sub-volume 4b, which is gas-filled, for example, and inadvertently causing an impact detection there with a filler material, indicator material or other material used for detection of an acceleration, even though an impact actually has not occurred.

In a schematic sectional view of the layer composite 20—at the height of the cavity—FIGS. 2A to 2C show first exemplary embodiments that permit a direction-dependent detection of acceleration forces that have occurred. With reference to these as well as all further figures of the Application, in which sectional views from the direction of the overhead view are likewise illustrated, the layer surrounding the cavity is—for the sake of brevity in the description—designated as intermediate layer 11; by analogy with the intermediate layer 11 from FIG. 1A. Notwithstanding this, however, this intermediate layer 11 may likewise even be omitted and instead the respective figure may illustrate a sectional view at the height of a part of the first and/or second foil 1; 2 that surrounds the cavity 4. Thus, notwithstanding the choice of words in the following description with respect to the illustrated layer, the layer composite can likewise also be formed according to FIGS. 1B to 1D.

In a schematic sectional view, FIG. 2A shows a cavity 4 with a first sub-volume 4a filled with the liquid 5. Its rim is predefined by the shape, i.e. the course of the retaining structure 6, which is annular here, on one or on both foils 1; 2 (at height above and/or below the drawing plane). The configuration and size of the retaining structure or retaining structures 6, especially the diameter or radius in this case of the circular-line-shaped, self-contained retaining structure or retaining structures 6, substantially defines where within the base face of the cavity the liquid is fixed until the effect of external impacts. The liquid quantity 5 is appropriately chosen according to the thickness or height of the cavity and according to the area extent of the face piece enclosed by the retaining structure 6 (sub-area of the first and/or second foil bordering the cavity). The diameter of the liquid droplet chosen in FIG. 2A therefore corresponds substantially to the location and to the diameter of the retaining structure or retaining structures 6 at the bottom and/or at the top of the cavity. The predominant, remaining part of the cavity 4 is filled with air or another gaseous atmosphere, and it forms the second sub-volume 4b; it is provided with respectively one lateral bulge 16, which is intended for collection of the liquid, spaced apart from the at least one retaining structure 6 in four directions. As an example, when an external impact or other force effect accelerates the impact sensor 10 in positive direction y and has a sufficient magnitude, the liquid 5 is accelerated in the direction of the arrow, i.e. in negative y direction, and moves into the bulge 16 illustrated at the bottom of FIG. 2A. There, by means of a suitable material (see hereinafter), or else even before, possibly by shaping the cavity with suitable capillary action, it can be permanently trapped and/or used to bring about a detection reaction. In the example of FIG. 2A, respectively one constriction with locally narrow cross section, i.e. with reduced width, is disposed to act as the capillary structure 19 in front of all lateral bulges 16.

FIG. 2B shows, in schematically simplified manner, the position of the accelerated liquid droplet 5 after the lateral escape from the at least one retaining structure 6, immediately before penetration into the capillary structure 19, and FIG. 2C shows the liquid quantity 5 ultimately trapped in the lateral bulge 16 after the impact, after it has passed the capillary structure 19. As a further modification, FIG. 2C illustrates constrictive guide structures 17, which facilitate penetration of the liquid into the capillary structures 19. Instead of these guide structures 17 formed solely by the shape of the base face of the cavity and the courses of its side walls, true guide structures in the narrower sense (see the exemplary embodiments hereinafter starting from FIG. 4) can also be provided directly on the surface of the first and/or second foil 1, 2, in order to convey a liquid quantity, once it has escaped from the first sub-volume 4a defined by the retaining element 6, even more selectively in the direction of a respective bulge 16 or of a filler or indicator material disposed therein. The material surrounding the cavity 4 in FIGS. 2A to 2C is optionally a material of the first 1 and/or second foil 2 and/or a material of an intermediate layer 11 disposed between both foils 1, 2.

FIG. 3 shows, in schematic cross-sectional view, perpendicular to the base face of the impact sensor, a first exemplary embodiment, in which a material 12, which is disposed in the cavity 4, is spaced apart from the at least one retaining structure 6 and thus spaced apart from the first sub-volume 4a, and which, upon contact with liquid 5 escaping from the first sub-volume 4a, leads to a visible change, possibly a permanent change and/or fixation of the liquid distribution within the cavity, or to a chemical reaction or to another change that can be otherwise measured or observed, that is suitable for detection and for permanent indication of the impact, force or acceleration effect of adequate minimum magnitude that has occurred at least one time. In FIG. 3, the layer composite 20 of the acceleration sensor 10 is formed, for example, in circular-ring-shaped manner; at least the first and the second foil are stacked one upon the other at the outermost rim; optionally an intermediate layer 11 is also between them. Preferably their outer rims are flush with one another (outermost circular line in FIG. 3); alternatively, they extend outwardly over the illustrated area portion. However, at least the outer contour of the cavity 4 and at the same time of its second sub-volume 4b is chosen circularly inside the base face of the layer composite 20 (second outermost circular line in FIG. 3); there a material piece 13 of a material 12, which is illustrated in annular manner here and which functions for detection and for permanent indication that the liquid 5 has reached the outer rim of the cavity, is situated inside the rim bounding the cavity. By means of the material 12, therefore, it can be permanently indicated that the liquid 5 has escaped at an arbitrary earlier instant under the action of impact from the centrally disposed, middle (first) sub-volume 4a, which is surrounded by the retaining structure 6 present on one or on both foils 1, 2. The position of the material 12 in FIG. 3 corresponds, for example, to the position indicated by dashed lines in FIGS. 1A and 1B for the case that the cavities 4 in the overhead view there are likewise configured in annular manner. In all figures and other embodiments of the Application, in which a material 12 is provided, this may be, for example, a filler material 12a, which upon contact with the liquid 5 permanently fixes, absorbs or otherwise binds it. The filler material 12a may in particular be porous, foam-like, swellable or absorbable in some other manner. The material 12 or filler material may be, for example, a fabric, a paper, a fleece, a printed or lacquered layer, a woven or nonwoven material, a mesh-like material (mesh tissue) or another organic or inorganic absorbent substance for absorption and/or binding of the liquid 5. The material 12 may be open-pored or closed-pored, but—in contrast to the material of intermediate layer 11—neither needs to possess a predetermined height or layer thickness nor to fill the cavity over its complete height. Instead of a material piece 13, the material 12 may likewise even be a material deposit, an accumulation of granular or powdered particles or an imprint or coat on one of the foils 1, 2 or on both foils.

However, the material 12, which is present here according to one of the said application forms, does not necessarily have to be a filler material. According to an alternative embodiment, the material 12 is instead an indicator material 12b, which upon contact with the liquid reacts chemically or in other visually observable or measurable manner with the liquid or with a substance contained therein. Whereas, in the case of a filler compound or of a filler material 12a, a certain minimum quantity is needed in order to be able to absorb or bind a sufficient liquid quantity, in the case of an indicator material 12b, an extremely small quantity of this material 12; 12b; 13 is sufficient to bring about and permanently preserve a clearly visibly or clearly measurable detection reaction. For example, the indicator material, in contrast to what is indicated in FIGS. 1A and 1B, needs to fill only a small part of the height of the cavity 4; as an example, it may be printed, coated or applied in other manner on one of the adjoining foil faces.

The material 12 therefore functions as indicator material for indication of the arrival of liquid in the region of this material 12. In the simplest case, the contact of the material 12 with the liquid 5 is shown by a color change, for example due to the indicator properties of the material 12; 12a which, for example, upon contact with the liquid, causes an acid-base reaction, a redox reaction, a complex-formation reaction or another chemical detection reaction. The reaction does not necessarily have to take place with the liquid itself; it may likewise take place between a substance dissolved or otherwise contained therein and the indicator material 12b. Thus, for example, water or another liquid that is inexpensive, non-harmful to health, environmentally friendly and/or colorless may be used. For example, it is possible to use, as the liquid, a liquid of sufficiently low vapor pressure an/or sufficiently high boiling point or possibly even water, especially water that itself does not contain any dyes, wherein upon arrival of the water or of the other liquid on the material 12 a dye is dissolved out of or liquefied from this material 12 or is formed or transformed in other manner. For example, a bleeding, i.e. area-wise spreading or leaching of a dye originally contained only in the region of the material 12; 12b; 13 can be generated and readily detected optically due to the arrival of the liquid.

As regards the lateral positioning and distribution of the material 12; 12a; 12b, FIG. 3 and the subsequent figures are merely exemplary; instead of a single material piece 13 or of a single continuous zone equipped throughout with the material 12 (in FIG. 3, for example, running along close to the outer rim of the cavity 4 and in a self-contained manner), it is also possible to provide, spatially separate from one another, a multiplicity of material pieces 13 or regions equipped with the material 12, in order to indicate, even more precisely, the direction of an impact that has occurred.

The impact sensor 10 of FIGS. 1A to 1D needs to be provided with only a single piece or a single region of the material 12 (filler 12a or indicator material 12b), as illustrated by way of example in FIG. 3. Alternatively, the impact sensor 10 may be provided with several pieces, segments or other kinds of regions of such a material 12, in order to permit recognition and/or indication of the direction of accelerations or impacts that have occurred, as illustrated, for example, on the basis of FIGS. 2A to 2C or of the following FIGS. 4A to 6. It is self-evident that the layer structure in the direction z of the normal to the surface of the layer composite 20 on the one hand and the extent, contour, geometry and other configuration of the cavity 4 on the other hand (including the arrangement and distribution of the material 12; 12a; 12b inside the base face of the cavity 4) can be selected and optimized independently of one another. Regardless of these selection options, the nature, form, number and/or technique for manufacture of the retaining webs or of the other retaining structures 6 may also be arbitrarily selected and optimized, i.e. regardless of the specific figures on the basis of which the respective embodiment of the retaining structure 6 is explained in this Application. Furthermore, the liquid and/or substances contained therein as well as the nature of the detection material 12; 12a; 12b; 13 may be selected and optimized regardless of the other features of the respective embodiments of the impact sensor mentioned in the foregoing. This is likewise the case for all exemplary embodiments described in the following.

The nature and composition of the liquid are selected appropriately, especially depending on the nature of the detection material 12, the geometric shape or other properties of the retaining structure 6, and further depending on the nature of the material of the first and/or second foil and/or in dependence on the spatial dimensions, especially the thickness or height of the cavity. For example, the liquid quantity and/or the nature of the liquid, especially the magnitude of its viscosity and/or of its surface tension, may be adapted to the spacing of the two foils 1, 2 in the region of the cavity or to other geometric or other features of the layer composite 20. Further influencing variables for dosing and selection of the liquid are, for example, the roughness of the surfaces of the top layers or foils 1, 2 that bound the cavity on both sides, or the length and/or the diameter of capillary structures 19, as they are explained by way of example in the foregoing on the basis of FIGS. 2A to 2C, for example.

FIGS. 4A to 6 show exemplary embodiments of an impact or acceleration sensor 10, the layer composite 20 of which is provided with a cavity 4 together with a multiplicity of lateral bulges 16, in which respectively separate pieces or regions of a material 12 (for example, filler material 12a or indicator material 12b) are disposed for direction-dependent detection of the escape of liquid that has occurred from the first sub-volume 4a of the cavity 4. For this purpose, FIGS. 4A, 5A and 6 show sectional views from the direction of the normal to the surface of the layer composite 20 at the height of the cavity 4; FIGS. 4B and 5B show cross-sectional views transverse to the height of the layer composite.

According to FIG. 4, the cavity 4 is provided with four lateral bulges 16, pockets or other kinds of external widened regions or lateral offshoots. The central, middle region of the cavity 4, above which and/or below which the retaining structure 6 or the multiplicity of retaining structures 6 is formed, is surrounded by a number of bulges 16 with respectively one separate piece or region of the material 12; 12a; 12b for detection of the escape of liquid. The lateral bulges 16 are regions of the cavity 4 that have a greater expanse or extent in a respective direction away from the retaining structure 6. The bulges 16 are therefore those regions of the cavity 4 wherein their outer circumference possesses the greatest spacing from the middle or the center, especially center of symmetry of the cavity 4. In particular, the cavity 4 is provided, respectively between two neighboring bulges 16, with respectively one indentation 26, the lateral outer wall of which has a smaller spacing from the middle or the center, especially the center of symmetry of the cavity 4, than the bulges 16 adjacent to them. Thus the side wall of the cavity 4 in the region of the bulges 16 is further removed from the center of the cavity or in any case from the retaining structure 6 or multiplicity of retaining structures 6 than in the region of the indentations 26.

In the cross-sectional view of FIG. 4B, on both sides of the retaining structures 6 or of the liquid 5, two of the four bulges from FIG. 4A are illustrated, in which respectively the material 12; 12a; 12b; 13 is provided. The sensor 10 according to FIGS. 4A and 4B, in which the contour of the cavity 4 inside the base face of the layer composite 20 is constructed in substantially cross-shaped or generally star-shaped manner (see FIG. 6), permits the detection of impacts of predetermined minimum magnitude and at the same time the indication of the direction of such impacts; according to FIGS. 4A and 4B along respectively positive and also negative x-direction and y-direction. Certainly the direction of an impact will generally deviate from these preferential directions, but nevertheless, whenever the component or vector component of the acceleration in the direction parallel to the layer composite is sufficiently large that the liquid droplets 5; 15 escape from the middle or central region bounded by the retaining structure 6 (first sub-volume 4a), these are moved in the direction of one or at most two bulges or material pieces 13 adjacent to one another, so that there the liquid is absorbed or a detection reaction, possibly a color reaction, takes place.

Also for use of an indicator material 12b, it is preferably provided that this or an additional absorbent material is so created that it absorbs or binds the entire arriving liquid quantity, so that subsequent wandering of liquid, once it has escaped, around to further material pieces 13 in other bulges 16 is prevented. Thereby the liquid intake and/or the indicator reaction is confined to those bulges 16 or material pieces 13 where the liquid quantity that has escaped first arrives immediately after the impact. Once a directional indication of an acceleration or of an impact has been caused, it is therefore preserved permanently.

Due to the geometry of the cavity and/or of the retaining structures 6 on the foils 1; 2, due to the nature and quantity of the liquid and due to the other features listed in the foregoing, the layer composite 20 of the impact sensor 10 can be formed in such a way that the impact sensor 10 is tripped reliably (i.e. in relation to a large number of manufactured impact sensors respectively capable of being tripped one time with low error ratio) in the event of impacts or accelerations above a certain magnitude, i.e. above a certain limit value or limit range on the magnitude scale. On the other hand, in the case of weaker impacts or weaker accelerations below the limit value or limit range on the impact magnitude scale, regularly, i.e. reliably, no detection reaction is tripped by the presented impact sensor, because the liquid droplet is unable to cross over the retaining web or the other embodiment of the retaining structure 6 on the respective foil.

In addition to the foils 1, 2 and the optional intermediate layer 11 (see FIGS. 1A to 1D), FIG. 4B also shows still further layers, of which at least one, some or all may be additionally contained in the layer composite 20 or layer stack of the impact or acceleration sensor. Thus an adhesive layer 22 is provided on that side or main face of the first foil 1 that is facing away from the cavity 4. Thereby the layer composite 20 as a whole can be glued onto an arbitrary underlying layer or another face oriented in arbitrary direction, especially on a packet, a package, a device, a larger system or any other article, for example a medicine container. During the manufacture and packaging of a large quantity of sensors 10 or labels 30 from a large-area layer composite 20, possibly from a layer composite 20 existing as sheet material or roll material, a large number of labels 30 can be stamped on a carrier layer 23 and/or possibly transported while still connected, by the fact that the carrier layer is not stamped or is merely kiss cut.

On that main face of the second foil 2 that is facing away from the cavity 4, it is possible to dispose a decorative layer or another inscription layer 21, with which an inscription or a printed image, any other information or a symbol is printed or configured in another way. The inscription layer 21 or alternatively the second foil 2 forms the upper side or outer side of the label 30; regardless of the orientation in which it is glued onto an article to be inspected for impacts.

In the figures explained in the foregoing, at most one single retaining element or one single retaining structure 6 is shown on each foil 1, 2. Alternatively, it is also possible to provide a multiplicity of retaining elements 6 on the first foil 1 and/or the second foil 2, as is illustrated in the exemplary embodiment of FIGS. 5A and 5B. According to FIG. 5A, four retaining structures 6, for example, are formed at, on and/or in the same foil 1 and/or 2. For example, the foil 1 or 2 or both foils 1, 2 may be provided with a multiplicity of retaining webs or other embodiments of retaining structures 6 (see above), which are disposed concentrically, for example. In particular, they may be retaining structures 6 that enclose one another. In particular, an arrangement of retaining elements 6 adjacent to one another may be provided, of which all retaining elements—except for the innermost and/or smallest element of them—encircle the first sub-volume 4a of the cavity 4 at a certain respectively differently large spacing, especially radius. According to FIG. 5A, the retaining structures 6 are formed in linear manner, especially as concentric circles. Due to the number of retaining structures 6, the limit value or limit range of the acceleration magnitude, within which the probability of tripping increases from a low value (approximately lower than 10 percent) to a high value (approximately higher than 90 percent), can be shifted in the direction of higher absolute values of the acceleration, since the droplet, after the crossing over of the first, innermost retaining structure, still has to overcome the surrounding further retaining structures 6 before it can reach the filler or indicator material 12; 12a; 12b. A multiplicity of retaining structures 6 may also be provided in embodiments with only one single, encircling material piece 13 (FIG. 3).

As an example, as shown in FIG. 5B, the retaining structures 6 may be formed on both main faces, turned toward one another, of the first 1 and of the second foil 2 and be disposed at different lateral spacing from the middle or the center, especially center of symmetry, of the cavity 4. Furthermore, as illustrated in FIG. 5A, it is possible to provide, on one or on both foils 1, 2 per bulge 16, i.e. per material piece 13, respectively at least one guide structure 17, which is spaced apart from the retaining structure 6 (or from the outermost retaining structure of a multiplicity of retaining structures) and leads into the bulge 16 and/or up to the detection material 12.

FIG. 5B, as representative for all other embodiments of this Application, shows moreover that the impact sensor 10 or its layer composite 20 can be formed in particular as a label 30, which can be glued onto an arbitrary article 60, possibly a packet 40 or another package 50, in order to detect and permanently indicate violent impacts that could occur due to improper handling or other influences. The face on which the label 30 is glued may be, for example, a face of a medicine container, its cover or its packaging, for example the end face or top side of an ampoule, of a vial, of another medicine container or of its/their one closure or of its/their outer packaging. The impact sensor and especially the layer composite 20 may additionally be joined, especially glued, together with further foils extending beyond the layer composite 20, especially plastic foils. For example, a label that seals an outer circumference of an ampoule, of a vial or of another medicine or liquid container or is provided for labeling of such a container may be provided with the impact sensor 10, possibly in a partial face region, which by design covers an end face of the medicine or liquid container and contains the layer composite 12. Thus even more complex label geometries may be realized, especially laterally outside the impact sensor, in order to fasten the impact sensor on articles with several, sometimes also curved faces.

Instead of only four surrounding bulges 16 with material pieces 13, it is also possible, as illustrated in FIG. 6, to provide another, especially larger number of these. By way of example, FIG. 6 shows eight bulges 16 disposed symmetrically around the at least one retaining structure 6, in which respectively one part or one piece of the filler or indicator material 12a; 12b is disposed. Aside from the lateral outer circumference of the liquid 5, which indicates the approximate location and extent of the single or possibly innermost retaining structure 6, no further retaining or guide structures are illustrated in FIG. 6.

FIGS. 4A to 6 therefore respectively show an arrangement of detector fields formed in crown-shaped manner, star-shaped manner or in other manner symmetrically around the retaining structure(s) for direction-dependent detection of impacts. In embodiments of these and other figures, in which guide structures 17 are provided, these may be formed in the same way as the variants of the retaining structures 6 described in the foregoing, i.e. for example as scored, printed, embossed or stamped lines or lines generated with a laser or, for example, by gas-phase deposition, especially elevations and/or depressions, such as was described in the foregoing. In the process, the retaining structures 6 and the guide structures 17, if both of them are provided, do not necessarily have to be generated or formed in the same manner, size or manufacturing technique.

Even if retaining structures 6 and guide structures 17 are supposed to be constructed, manufactured or formed (in cross section, i.e. perpendicular to the respective structure line) in the same way in one embodiment of the impact sensor, their functions and technical effects are nevertheless different, because the water or liquid droplets are completely encircled and bounded by the retaining structure, whereas once a water or liquid quantity 5 has escaped it is able to travel further along one side of a guide structure line 17 at first until it reaches the material 12, even though the liquid quantity would not have to cross specifically through the guide structure 17 for this purpose. Thus both the retaining structures 6 and the guide structures 17 may have an identical line profile or an identical line cross section and/or be generated in the same manner, for example as scored lines, printed elevations or upward arches or as depressions of the respective foil face.

For the embodiments described in the Application, the height of the cavity 4 may be, for example, between 1.0 and 2.0 mm. If several retaining structures 6 are provided on the same foil, their radial or lateral spacing from one another may be, for example, between 0.5 mm and 3.0 mm.

For creation of a capillary effect between them, the guide lines 17 may lie particularly close to one another, in particular closer than the retaining lines are to one another. In this way, scored or otherwise formed guide structures 17 may function as capillary structures 19 (see FIG. 2A).

FIG. 7 shows an exemplary embodiment of an impact sensor 10 for detection of impacts along a preferential direction or measurement direction y. The elongately formed cavity 4 contains, on one side, at least one retaining structure 6 that surrounds liquid quantity 5, and on another, opposite side contains a material 12, which functions for detection of the escape of liquid from the first sub-volume 4a predefined by the holding structure 6. A number of guide structures 17 may be provided between the material 12 and the at least one retaining structure 6. For example, the cavity 4 is surrounded by one or both foils 1; 2 and/or by an intermediate layer 11.

In another, alternative design similar to FIG. 7, it is also possible, instead of the border of the cavity 4 denoted with the reference symbols 1, 2 or 11, to dispose, at the same place, and with the same lateral dimensions, a second material or material piece, which in contrast to the detection material 12 indeed absorbs or binds the liquid upon contact therewith, but does not lead to a color change or to any other indication of an impact. Thereby it is possible to avoid the situation that, in the event of violent impacts that convey the liquid in other directions out of the first sub-volume 4a, the liquid subsequently travels in the direction of detection material 12, i.e. by wandering around within the second sub-volume 4b, and despite completely different impact direction still leads to a tripping result or to indication of an impact. Inasmuch as such a second material or material piece is provided, the rim of the cavity extends around the outer rim of such a second material or material piece, i.e. around (in this modification of FIG. 7) around the shaded rectangular zone. Such an additional, second material or material piece may also be provided in all other embodiments.

FIG. 8 shows an impact sensor 10 with a layer composite 20, which is provided between the first 1 and the second foil 2 with a multiplicity of separate cavities 4, 4', 4", which are spaced apart from one another in lateral direction. Although these cavities are illustrated in FIG. 8 as separated only by narrow lines, sufficiently broad material strips of the layer 1, 2 and/or 11 are situated between them in order to separate all cavities and their liquid quantities from one another. Respectively one liquid quantity 5, 5', 5" is situated in the respective first sub-volume 4a of the respective cavity and respectively one material piece 13 or another application form of the detection material 12, especially filler or indicator material 12a, 12b, is situated in the respective sub-volume 4b, i.e. the remaining cavity volume outside the (innermost) retaining structure 6.

According to FIG. 8, it is provided that the impact sensor 10 contains, within the layer composite 11, a multiplicity of sensitive individual sensors 24a, 24b, 24c that are independent of one another. A preferred embodiment of FIG. 8 provides that each of the individual sensors reacts differently to external impacts or accelerations. In particular, it may be provided that each of the individual sensors 24a, 24b, 24c has a differently high limit range or limit value, especially minimum limit value, with respect to the minimum magnitude of detectable impacts or accelerations. Thereby the magnitude of impacts that have occurred can be limited, by the fact that it is recorded whether all, none or only one or some of the individual sensors 24a, 24b, 24c are indicating an impact that has occurred (preferably in direction-dependent manner). As an example, the multiplicity of individual sensors 24a, 24b, 24c in the layer composite 20 may be disposed in such a way that a first individual sensor 24a, illustrated in FIG. 8 in the foregoing, for example, has the lowest limit value or limit range for the minimum magnitude of detectable impacts or accelerations, while the respective limit value or limit value range is respectively higher for each subsequently disposed further individual sensor 24b, 24c, for example is larger by a specified amount. The more violent an impact is, the more individual sensors react to the impact and indicate it. In the case of a visual detection, which can be realized, for example, with a bleeding of dye or a color change in the region of the material 12 or of the liquid that has come into contact therewith, the substances of the materials 12 and/or of the respective liquids 5, 5', 5" can also be chosen differently, for example in such a way that the individual sensor 24a brings about a color change to green for relatively small impact magnitudes that are still tolerable, while in contrast a further sensor 24c with much higher threshold or limit value brings about a color change to red when it reacts. In addition, at least yet one more sensor 24b may be provided, the detection sensitivity of which is lower than that of the sensor 24a but higher than that of the sensor 24c and that reacts to impacts above a medium magnitude that is just still uncritical and indicates them with a color change to yellow or orange. Thus, somewhat similarly to a traffic signal, an arbitrary arrangement of two, three or even more individual sensors 24 is able to communicate a visual impression of the probability of damage to an article or packet labeled with the impact label 10, in a manner immediately understandable even for an uninformed lay person, who is not more familiar with the structure and the specific tripping behavior of the respective individual sensors 24. In FIG. 8, the threshold or limit values for the specific minimum magnitude above which the respective sensor 24a, 24b, 24c is able to indicate an impact that has occurred become increasingly higher from the individual sensor 24a to the individual sensor 24c and are illustrated by differently thin arrows, wherein the individual sensor 24c arrow illustrated at the very bottom and associated with the thinnest arrow has the lowest probability of tripping or sensitivity.

The complete sensor containing individual sensors that respond at differently high limit magnitudes can be realized, for example, by constructing the retaining structures 6 of the respective cavities 4, 4', 4" to be differently large, differently high, differently deep, differently wide or in other ways differently strong but passable barriers for the respective liquid quantity. Alternatively, or in combination therewith, this can also be realized by the fact that respectively different or differently composed liquids 5, 5', 5" are provided in the respective cavities 4, 4', 4". For example, they may be liquids that respectively have a differently high surface tension, wetting capability, adhesion force, density and/or viscosity. By such embodiments, it is possible for the respective retaining structure 6 of multiplicity of retaining structures to be crossed over by the respective liquid droplets 5; 5'; 5" when an acceleration or an impact, to which the respective individual sensor 24a; 24b; 24c is matched, occurs with a magnitude that is higher than the threshold or limit value.

The modification possibility shown on the basis of FIG. 8, wherein a multiplicity of individual sensors is provided instead of only a single one of them, and/or the modification to the effect that several of them with different limit-value magnitudes are formed together within the same layer composite 20, can be combined with each of the other embodiments of this Application. The resulting combinations of features can likewise be modified to the effect that the direction of such individual sensors, possibly even with several material pieces 12 per individual sensor, may be selected differently for some or all individual sensors. Whereas complex tube systems or container geometries are often also necessary in conventional acceleration sensors, impacts in arbitrary directions and/or of arbitrary magnitudes can be detected according to the present Application with one or some few impact sensors 10 or labels 30 equipped therewith, for example close to a corner or edge of a packet, of a package or of any other article. For this purpose it is sufficient to glue respectively one impact sensor on merely two neighboring outer faces of an article or packet oriented at approximately 90° relative to one another, for example on two faces close to the middle of the edge between them. Even though the embodiments of the impact sensor 10 are usually also denoted commonly as label 30 in the figures, the respective impact sensor 10 nevertheless does not have to be formed as a label; any other embodiment that contains such a layer composite of at least two foils 1, 2 is likewise conceivable.

FIG. 9 shows an exemplary embodiment that permits an electrical (instead of optical or visual) indication of a liquid escape caused by impact or acceleration. Each material piece 12; 13 adjoins a corresponding electrode 27 or electrode array or in any case is disposed in its vicinity, in order, when the liquid 5 is in contact, to maintain the liquid in the region of the electrode. As an example, the electrode 27 may be printed or otherwise fastened or disposed on one of the foils 1, for example as an interdigital structure 28 of two individual electrodes 27a, 27b, as illustrated in the schematic overhead view in FIG. 10. In the region of a respective material piece 12, therefore, an electrical measurement leads to a change of the capacitance and/or of the electrical resistance between two individual electrodes 27a, 27b of the respective complete electrode 27 or interdigital structure 28. Each material piece 13 from FIG. 9 may be provided with its own interdigital structure 28 or electrode array of at least two individual electrodes, for example according to FIG. 10. Furthermore, the electrode terminals of some or all electrode pairs, for example only the first individual electrodes 27a of all lateral bulges or material pieces 13, can be connected to the same terminal and therefore be at the same potential.

In all embodiments of the Application, such an electrical measurement may be made instead of an optical detection by indicator materials. Whereas, for optical detection, at least the outer of the two foils 1 or 2—whether colored or uncolored—should be at least transparent or in any case translucent, i.e. showing through, and optional inscription layers 21 should be equipped if necessary with windows or cutouts, in the case of an electrical measurement the upper side of the impact sensor does not have to be transparent. The acceleration sensors of all embodiments can therefore also be realized by means of opaque foils at the foils 1, 2 or with other opaque individual layers of the layer composite; especially even on both sides of the cavity 4.

For example, conductor tracks, which are printed, stamped, etched or in some other way applied on and/or introduced into the material of the respective foil 1; 2 (or the boundary layer adjoining the cavity 4) may be used as the electrodes 27a, 27b. The conductor tracks may be formed, for example, from copper, silver, gold, aluminum or any other metal or a metal alloy, from carbon, alternatively, for example, from indium, germanium or from a conductive polymer or conductive adhesive. The conductor tracks or pairs of conductor tracks may further comprise an RFID antenna and/or an electronic evaluation unit; they may be connected to such an antenna or evaluation unit or even form a component of an antenna and/or evaluation unit. The evaluation unit permits measurements of changes of the conductivity, of the resistance of the capacitance or of any other electrical property after direct or indirect contact with the liquid 5. For example, during a capacitive measurement, the change of capacitance of a conductor track is detectable that occurs when the liquid approaches the conductor track, surrounds the conductor track and/or touches the insulating sheath or the insulation layer of the conductor track (indirect contact with the conductor without short circuit). By means of the antenna, especially an RFID antenna, a passive measurement, storage and/or transfer of the measured result is possible without its own current or voltage source.

Furthermore, the impact sensors of all embodiments may be configured as combined sensors or indicators, which may also sense and/or indicate further influences or events. For example, they may also be designed simultaneously as a pressure equalization sensor, as an indicator of a chronological temperature variation, for measurement of an irradiation or radiation dose, for example of light, of UV radiation or of radioactive radiation, or as a indicator of freezing or other indicator of temperature or temperature variation. Impact sensors of all embodiments may additionally fulfill such additional functions and at the same time be designed as a label, for example as a pressure equalization label or label for monitoring a temperature variation, an overshoot or undershoot of a limit temperature or of a radiation dose.

FIGS. 11 and 12 show, by way of example, an exemplary embodiment of an impact sensor 10, the layer composite 20 of which is formed in such a way that the impact sensor is sensitive for impacts not from the beginning on but only after activation, i.e. sensitizing or sensitization of the sensor, possibly by a manual or automatic action, for example automatically by the process of attachment itself. Outside the cavity 4, the layer composite 20 is also provided with a further cavity 14, which is in communication or can be placed in communication through a passage opening 18, for example in the second foil 2, with the cavity 4 between the foils 1, 2. In this embodiment, the liquid 5 in the brand-new, original state of the sensor 10, layer composite 20 and/or label 30 is situated not in the cavity 4 but in the further cavity 14, and from there it must first be forced or conveyed into the cavity 4 in order to make the sensor sensitive for impacts that have occurred. As an example, this may take place manually by hand, automatically and especially by the attachment of the label 30 to an article 60, for example to a packet or a package 40, 50, which touches that side of the layer composite 20 where the detachable carrier foil 23 was previously disposed.

In order to convey the liquid quantity out of the further cavity 14 and into the cavity 4 automatically by the process of attachment or gluing of the label, the layer composite 20 may be regionally compressible. For example, a third foil 3, which together with the second foil 2 encloses the further cavity 14, is disposed in the surroundings of the further cavity 14. In addition, a further intermediate layer 31 may be optionally provided. Finally, an adhesive layer 22 and/or (on the opposite side) an inscription layer 21 or decorative layer may also be provided as outer layers. One, some or all of the layers 31, 3 and/or 22 may optionally be compressible in the direction of their layer thickness; one or some of them may be foam layers. In FIG. 11, the third foil 3 is arched around the further cavity 14 and may be deformed in the region of the further cavity 14, especially squeezed in the direction of the layer thickness. Thus the third foil 3 or another layer, even if it consists not of compressible, porous or foam-like material but instead of a volume material, may be "compressible" or squeezable by the fact that, as illustrated by way of example in FIG. 11, it extends around the further cavity 14 and there is upwardly arched in a direction away from the further cavity 14, for example as a result of an embossing process. The main face of the third foil 3 turned toward the second foil 2 is therefore depressed, and specifically in a direction away from the second foil 2. The height of the further cavity 14 is thereby greater than the surrounding distance between the two foils 2, 3 or than the layer thickness of an optional further intermediate layer 31. The further cavity 14 can also be made without such an intermediate layer 31, possibly by an embossing process.

Preferably, the further cavity 14 is compressed during attachment of the label or before or after, whereby the liquid escapes at least partly from the further cavity 14; via the passage opening 18, it travels into the actual cavity 4 functioning for the acceleration measurement, where it is held in position, i.e. fixed in lateral direction (parallel to the main faces of the foils), by one or more retaining structures 6, which optionally are disposed on one or on both foils 1, 2. It is only in this state that the impact sensor 10 becomes sensitive for impacts, in any case for impact components in the direction parallel to the main plane of the layer composite 20. The first sub-volume 4a, which is encircled at the surface of the first and/or second foil 1; 2 by the retaining structure 6 or by the innermost retaining structure 6 of an arrangement of several retaining structures 6 and thus is predefined, functions (as in the other embodiments) for introducing and positioning of the liquid in contact with both foils 1 and 2, provided the impact sensor 10 is sensitive for impacts or other accelerations of predetermined minimum magnitude. The sensitive state in the other embodiments exists from the beginning on, i.e. with manufacture of the label 30 or of the other impact sensor 10; in FIG. 11, on the other hand, this is the case only with the sensitizing of the sensor by transfer of the liquid 5 from the further cavity 14 into the cavity 4 (or into its first sub-volume 4a inside the retaining structure 6 or inside the innermost retaining structure 6 of a multiplicity of retaining structures 6). The sensitive state ends as soon as an impact of sufficient magnitude occurs that accelerates the liquid from the first sub-volume 4a into the second sub-volume 4b as far as the detection material 12, where the arrival of the liquid is permanently indicated visually, electrically or in some other way by the sensor 10.

FIG. 12 shows the label 30 or the impact sensor 10 from FIG. 11 in this sensitive state, i.e. immediately after the transfer of the liquid 5 from the further cavity 14 into the first sub-volume 4a of the cavity 4. The upward arching of the third foil 3 has been reduced by compression of the layer composite 20, for example by the gluing and pressing of the adhesive label 22 during attachment, and thereby the further cavity 14 has been at least partly emptied via the passage opening 18.

In the delivery state according to FIG. 11, the further cavity 14 may optionally be filled completely or partly with the liquid 5. According to an improvement, the droplet 15 or other kind of liquid reservoir 25, provided it is situated in the further cavity 14, may be encapsulated, i.e. surrounded by a capsule or other sheathing of a destructible foil, of gelatin, of wax or of any other organic or inorganic sheathing material. By means of such a sheath or capsule, the droplet may be fastened to the passage opening 18 of the adjoining foil—in this case the foil 2—especially directly. The further cavity 14 or in any case the sheath or the capsule, which in FIG. 11 is indicated by a dashed line around the liquid 5, functions as a reservoir before the activation of the sensor and also facilitates the reliable, if necessary complete conveyance of the liquid quantity into the passage opening 18 and into the first sub-volume 4a of the cavity 4. After the sensitizing of the sensor, not only the first sub-volume 4a but often also the passage opening 18 as well is still filled with liquid, even though otherwise illustrated in FIG. 12.

All embodiments described in this Application can be realized by means of the simplest laminating, printing and stamping techniques, possibly such in the scope of label manufacture, whereby impact sensors of the simplest design and lowest fabrication costs can be manufactured. They may additionally contain several individual sensors with graduated, differently highly sensitive tripping behavior and/or one or more sensors with direction-dependent impact detection, even inside the base face of a common, uninterrupted layer composite. In this way, the direction and magnitude of an external impact or of any other acceleration, including negative accelerations, i.e. braking processes, are detectable. As an example, the impact sensor may be designed as a shaking sensor, shock sensor or position sensor for qualitative and/or quantitative measurement or as a pure impact, shock, position or shaking indicator for mere display, i.e. for mere indication of the occurrence of such an effect. During shipping of packaged articles, impacts may be measured particularly selectively—or with selectively increased measurement accuracy—along certain preferential directions, for example along such directions in which the impact sensitivity of the transported article is particularly high or the article is particularly susceptible to damage in the event that accelerations occur.

As an example, the retaining structures 6 may be retaining webs or other self-contained and/or line-like elevations, imprints or depressions, such as scored, embossed, kiss-cut or lasered structure lines. With the at least one retaining structure, a foil-based impact sensor formed substantially as a layer composite can be realized, in which—in contrast to conventional impact sensors—the liquid quantity is maintained in contact with two foils 1, 2 spaced apart from one another or other layers or surfaces, which preferably are parallel to one another and turned toward one another. By means of the retaining structures 6, the liquid is fixed in lateral direction, i.e. in sideways directions parallel to the foil faces or other kinds of main faces turned toward one another, at least as long as no impact above the limit magnitude occurs, that causes the liquid to cross over the retaining structure 6 and escape from the first sub-volume 4a surrounded by the retaining structure 6. In addition, impact sensors can be realized in which, after the passage through a passage opening 18 of a foil 2 and contact by the liquid with a further, oppositely disposed foil 1 (see FIG. 11 or 12, for example), this liquid does not automatically cause a tripping process, but instead the sensor is merely changed to a sensitive state, in which it is ready for indication of a subsequently occurring impact.

LIST OF REFERENCE SYMBOLS

1 First foil
2 Second foil
3 Third foil
4; 4'; 4" Cavity
4a First sub-volume
4b Second sub-volume
5; 5'; 5" Liquid
6 Retaining structure
6a Elevation
6b Depression
7 Line cross section
8 Irregularity
9 Coating
10 Impact sensor
11 Intermediate layer
12; 12'; 12" Material
12a Filler material
12b Indicator material
13; 13'; 13" Material piece
14 Further cavity
15 Droplet
16 Bulge
17 Guide structure
18 Passage opening
19 Capillary structure
20 Layer composite
21 Inscription layer
22 Adhesive layer
23 Carrier layer
24a, 24b, 24c Individual sensor
25 Liquid reservoir
26 Indentation
27; 27a; 27b Electrode
28 Interdigital structure
30 Label
31 Further intermediate layer
40 Packet
50 Package
60 Article
x First lateral direction
y Second lateral direction
z Vertical direction

The invention claimed is:

1. An impact sensor for detection of an impact or of any other acceleration, wherein the impact sensor contains a liquid in the form of a droplet or of any other liquid reservoir and is designed such that a position and/or distribution of the liquid in the impact sensor indicates whether the impact sensor has been exposed to an impact or to any other acceleration of a predetermined minimum magnitude,
wherein the impact sensor is provided with a layer composite that comprises at least the following:
a first foil,
a second foil,
at least one cavity, slot or other recess disposed between a foil face of the first foil and a foil face of the second foil and
at least one retaining structure, which is disposed on the foil face of the first and/or second foil,
wherein the at least one retaining structure is designed to maintain the liquid in a predetermined first sub-volume of the cavity in contact with both the first and second foils as long as the impact sensor is sensitive for impacts or other accelerations of predetermined minimum magnitude, and further is designed to permit an escape of the liquid or a part of the liquid from the first sub-volume into a second sub-volume of the cavity that functions for collection of the liquid only in the event of an impact or of any other acceleration above the predetermined minimum magnitude,
wherein the at least one retaining structure is a region of the first and/or second foil that is formed as a local elevation, depression or as any other local irregularity of the foil face of the first and/or second foil, and wherein the local elevation, depression or other local irregularity
forms a passable barrier for a wetting and/or contacting of the first and/or second foil by the liquid and
an area piece of the foil face of the first and/or second foil, which corresponds to the first sub-volume, defines the first and/or second foil.

2. The impact sensor according to claim 1, wherein the at least one retaining structure comprises a stamped, embossed, scored, printed, glued local irregularity or such formed in another manner or coating, which is disposed on a main face of the first and/or second foil adjoining the cavity.

3. The impact sensor according to claim 1, wherein the elevation, depression or other local irregularity runs as a circular, annular or other self-contained line on the foil face of the first and/or second foil.

4. The impact sensor according to claim 1, wherein the at least one retaining structure comprises a first retaining element of the first foil and a second retaining element of the second foil.

5. The impact sensor according to claim 1, wherein the impact sensor is provided in at least one region of the second sub-volume, which is spaced apart from the first sub-volume and/or from the at least one retaining structure with a material, which permits a detection of the escape of the liquid from the first sub-volume, by the fact that, upon contact with the liquid, it the material absorbs, fixes or binds the liquid, dissolves at least partly in the liquid and/or participates in a chemical or other visually observable or measurable reaction with the liquid.

6. The impact sensor according to claim 1, wherein the impact sensor is provided in at least one region of the second sub-volume, which is spaced apart from the first sub-volume and/or from the at least one retaining structure with an electrode, an interdigital structure of several electrodes and/or some other electrode array by which, upon contact with the liquid or during approach of the liquid, a change of the capacitance, of the electrical resistance or of some other electrical property can be measured.

7. The impact sensor according to claim 1, wherein the impact sensor is provided in a multiplicity of regions of the second sub-volume, which are spaced apart in different directions from the first sub-volume with a material, which upon contact with the liquid, absorbs, fixes or binds the liquid, dissolves at least partly in the liquid and/or participates in a chemical or other visually observable or measurable reaction with the liquid.

8. The impact sensor according to claim 5, wherein the at least one retaining structure and/or the first sub-volume predefined by the retaining structure is disposed in a middle or at a center of a lateral extent of the cavity and wherein the cavity is provided with a multiplicity of lateral bulges, pockets or other kinds of external widened regions or offshoots, which are disposed in respectively different directions symmetrically around the at least one retaining structure and/or in a manner distributed around the first sub-volume and in which material pieces or other separate regions of the material are disposed respectively separated from one another.

9. The impact sensor according to claim 5, wherein the impact sensor is provided in the second sub-volume of the cavity, on an adjoining main face of the first and/or second foil, with at least one guide structure, which is spaced apart from the at least one retaining structure, extends laterally up to a region of the second sub-volume of the cavity equipped with the material, and upon impact-induced escape of the liquid from the first sub-volume conducts the liquid in the direction of the material and/or up to the material.

10. The impact sensor according to claim 5, wherein the material is a porous, foam-like, swellable or otherwise absorbent filler material, which upon contact with the liquid permanently binds the liquid.

11. The impact sensor according to claim 5, wherein the material is an indicator material, which upon contact with the liquid reacts chemically or in other visually observable and/or measurable manner with the liquid or with substances contained therein.

12. The impact sensor according to claim 1,
wherein the layer composite of the impact sensor is also provided on a side of the second foil turned away from the first foil at least with the following:
a third foil and
disposed between the second foil and the third foil, a further cavity, slot or other recess, which functions for introduction of the liquid before putting to use of the impact sensor,
wherein the further cavity is in communication via a passage in the second foil with the cavity between the first foil and the second foil and
wherein the layer composite is compressible and/or deformable in the region of the passage opening, in such a way that the liquid is conveyed at least partly out of the further cavity into the first sub-volume of the cavity between the first foil and the second foil, in order to make the impact sensor sensitive for impacts or other accelerations of predetermined minimum magnitude.

13. The impact sensor according to claim 5, wherein the layer composite of the impact sensor is provided between the first foil and the second foil with a multiplicity of separate cavities, slots or other recesses, which are separate from one another and contain respectively at least the following:
a respective first sub-volume, which is filled or can be filled with a respective quantity of liquid,
a respective second sub-volume, which is equipped with a respective material piece or region of a material, which upon contact with the liquid, absorbs, fixes or binds the liquid, dissolves at least partly in the liquid and/or participates in a chemical or other visually observable or measurable reaction with the liquid, and
at least one respective retaining structure, which defines and/or surrounds the respective first sub-volume,
wherein the retaining structures of the respective cavities are formed in a manner differently large, differently high, differently deep, differently wide and/or in other ways differently thick but surmountable barriers to migration of the liquid parallel to a main face of the first and/or second foil.

14. The impact sensor according to claim 5, wherein the layer composite of the impact sensor is provided between the first foil and the second foil with a multiplicity of separate cavities, slots or other recesses, which are separate from one another and contain respectively at least the following:
a respective first sub-volume, which is filled or can be filled with a respective quantity of liquid,
a respective second sub-volume, which is equipped with a respective material piece or region of a material, which upon contact with the liquid, absorbs, fixes or binds the liquid, dissolves at least partly in the liquid and/or participates in a chemical or other visually observable or measurable reaction with the liquid, and
at least one respective retaining structure, which defines and/or surrounds the respective first sub-volume,
wherein respectively different or differently composed liquids having respectively different values of the surface tension, wetting capability, adhesion force, density and/or viscosity are contained in the respective cavities and, during impacts or other accelerations occurring at respectively differently high magnitude, overcome the respective retaining structure or the respective multiplicity of retaining structures.

15. The impact sensor according to claim 1, wherein the impact sensor is formed as a flat, attachable label for labeling of a packet, of a package, of a medicine container or of another article.

* * * * *

UNITED STATES PATENT AND TRADEMARK OFFICE
CERTIFICATE OF CORRECTION

PATENT NO. : 11,391,751 B2
APPLICATION NO. : 16/069937
DATED : July 19, 2022
INVENTOR(S) : Zimmermann et al.

It is certified that error appears in the above-identified patent and that said Letters Patent is hereby corrected as shown below:

In the Claims

In Claim 1, Line 19 (Line 8 of Column 22) please delete "both"
In Claim 5, Line 7 (Line 48 of Column 22) please delete "it"

Signed and Sealed this
Twenty-third Day of August, 2022

Katherine Kelly Vidal
*Director of the United States Patent and Trademark Office*